US012700229B2

(12) United States Patent
Tanno

(10) Patent No.: US 12,700,229 B2
(45) Date of Patent: Aug. 4, 2026

(54) PNEUMATIC TIRE AND VEHICLE

(71) Applicant: The Yokohama Rubber Co., LTD.,
Tokyo (JP)

(72) Inventor: Atsushi Tanno, Hiratsuka (JP)

(73) Assignee: The Yokohama Rubber Co., LTD.,
Tokyo (JP)

( * ) Notice: Subject to any disclaimer, the term of this
patent is extended or adjusted under 35
U.S.C. 154(b) by 178 days.

(21) Appl. No.: 17/673,725

(22) Filed: Feb. 16, 2022

(65) Prior Publication Data

US 2022/0172465 A1 Jun. 2, 2022

Related U.S. Application Data

(63) Continuation of application No. 15/526,286, filed as
application No. PCT/JP2015/081400 on Nov. 6,
2015, now abandoned.

(30) Foreign Application Priority Data

| Nov. 12, 2014 | (JP) | ................................. | 2014-229990 |
| Nov. 12, 2014 | (JP) | ................................. | 2014-229991 |
| Nov. 21, 2014 | (JP) | ................................. | 2014-236955 |

(51) Int. Cl.
*B60C 11/24* (2006.01)
*B60C 5/00* (2006.01)
(Continued)

(52) U.S. Cl.
CPC .............. *G06V 20/176* (2022.01); *B60C 5/00*
(2013.01); *B60C 9/18* (2013.01); *B60C 11/00*
(2013.01);
(Continued)

(58) Field of Classification Search
CPC ...... B60C 11/24; B60C 11/243; B60C 11/246
See application file for complete search history.

(56) References Cited

U.S. PATENT DOCUMENTS

| 3,578,055 A | 5/1971 | French |
| 3,946,782 A | 3/1976 | Petrasek |

(Continued)

FOREIGN PATENT DOCUMENTS

| DE | 41 22 648 | 1/1993 |
| DE | 11 2011 105 642 T5 | 8/2014 |

(Continued)

OTHER PUBLICATIONS

International Search Report for International Application No. PCT/
JP2015/081400 dated Feb. 2, 2016, 5 pages, Japan.
(Continued)

*Primary Examiner* — Cedrick S Williams
(74) *Attorney, Agent, or Firm* — Thorpe North &
Western, LLP

(57) ABSTRACT

A pneumatic tire includes a carcass portion, a belt layer, a
tread portion including a tread rubber, and a sidewall portion
including a sidewall rubber. The tread portion includes a
center portion, shoulder portions disposed on both sides of
the center portion, and a lug groove disposed at the shoulder
portions and extending outward of a ground contact edge
portion of the tread portion. A shoulder region is defined
between the ground contact edge portion and a terminating
portion of the lug groove. A colored region is disposed
continuously or intermittently in the circumferential direc-
tion at the shoulder region.

24 Claims, 24 Drawing Sheets

(51) Int. Cl.

| | |
|---|---|
| *B60C 9/18* | (2006.01) |
| *B60C 11/00* | (2006.01) |
| *B60C 11/01* | (2006.01) |
| *B60C 11/03* | (2006.01) |
| *B60C 11/13* | (2006.01) |
| *B60C 13/00* | (2006.01) |
| *C08K 3/013* | (2018.01) |
| *C08K 5/00* | (2006.01) |
| *G06V 20/10* | (2022.01) |

(52) U.S. Cl.
CPC ...... *B60C 11/0008* (2013.01); *B60C 11/0041* (2013.01); *B60C 11/01* (2013.01); *B60C 11/03* (2013.01); *B60C 11/0306* (2013.01); *B60C 11/1307* (2013.01); *B60C 11/24* (2013.01); *B60C 13/00* (2013.01); *B60C 13/001* (2013.01); *C08K 3/013* (2018.01); *C08K 5/0041* (2013.01); *B60C 2009/1828* (2013.01)

(56) References Cited

U.S. PATENT DOCUMENTS

| | | | |
|---|---|---|---|
| 4,226,274 A | 10/1980 | Awaya et al. | |
| 6,124,925 A | 9/2000 | Kaneko et al. | |
| 6,499,422 B1 | 12/2002 | Petersen | |
| 6,615,649 B1 | 9/2003 | Kokubu et al. | |
| 8,164,628 B2 | 4/2012 | Stein et al. | |
| 9,150,052 B2 | 10/2015 | Mashiyama | |
| 2002/0092591 A1 | 7/2002 | Cortes | |
| 2002/0124922 A1 | 9/2002 | Carra et al. | |
| 2003/0231507 A1 | 12/2003 | Young | |
| 2004/0103974 A1 | 6/2004 | Majumdar et al. | |
| 2004/0108035 A1 | 6/2004 | Majumdar | |
| 2004/0118496 A1* | 6/2004 | Vannan | B60C 11/00 156/123 |
| 2009/0244284 A1 | 10/2009 | Suita et al. | |

| | | | |
|---|---|---|---|
| 2010/0181992 A1 | 7/2010 | Hino et al. | |
| 2012/0200707 A1 | 8/2012 | Stein et al. | |
| 2013/0333458 A1 | 12/2013 | Lamb et al. | |
| 2016/0098839 A1 | 4/2016 | Stein et al. | |
| 2016/0318346 A1 | 11/2016 | Clemmer et al. | |
| 2017/0100966 A1 | 4/2017 | Matsunaga et al. | |

FOREIGN PATENT DOCUMENTS

| | | | | |
|---|---|---|---|---|
| FR | 2 814 116 | 3/2002 | | |
| FR | 2814116 A1 * | 3/2002 | ............ | B60C 11/00 |
| GB | 448223 | 6/1936 | | |
| JP | S48-098803 | 11/1973 | | |
| JP | H06-194236 | 7/1994 | | |
| JP | H08-318715 | 12/1996 | | |
| JP | H09-277806 | 10/1997 | | |
| JP | H11-059125 | 3/1999 | | |
| JP | 2000-343918 | 12/2000 | | |
| JP | 2001-301428 | 10/2001 | | |
| JP | 2004-216921 | 8/2004 | | |
| JP | 2006-123703 | 5/2006 | | |
| JP | 2008-101987 | 5/2008 | | |
| JP | 2009-250617 | 10/2009 | | |
| JP | 2010-195236 | 9/2010 | | |
| JP | 2012-224194 | 11/2012 | | |
| JP | 2013-044655 | 3/2013 | | |
| JP | 2013-101040 | 5/2013 | | |
| JP | 2014125119 A * | 7/2014 | | |
| WO | WO 98/03358 | 1/1998 | | |
| WO | WO 2009/013928 | 1/2009 | | |
| WO | WO 2013/115092 | 8/2013 | | |

OTHER PUBLICATIONS

Yang Zhaosheng et al., Introduction to Intelligent Transportation Systems, Jan. 2003, China Communications Press, 1st edition, 1st Printing.

* cited by examiner

PNEUMATIC TIRE AND VEHICLE

RELATED APPLICATIONS

This application is a continuation of U.S. patent application Ser. No. 15/526,286, filed on May 11, 2017, which is the National Stage of International Patent Application No. PCT/JP2015/081400, filed on Nov. 6, 2015, which claims the benefit of priority from Japan Patent Application Nos. 2014-229990 filed on Nov. 12, 2014, 2014-229991 filed on Nov. 12, 2014, and 2014-236955 filed on Nov. 21, 2014, the entire contents of each of which are incorporated herein by reference.

TECHNICAL FIELD

The present technology relates to a pneumatic tire and a vehicle.

BACKGROUND ART

In the technical field of automobiles, collision avoidance systems that detect the distance between a leading vehicle and a following vehicle and prevent collisions between the vehicles have been put into practical use. Systems using millimeter wave sensors, systems using radar sensors, and systems using cameras are known as systems for detecting the distance between vehicles. U.S. Pat. No. 8,164,628 and Japanese Unexamined Patent Application Publication No. 2013-101040A describe technologies for estimating the distance between a leading vehicle and a following vehicle using an image acquired by a camera. U.S. Pat. No. 8,164,628 describes a technology for estimating the distance to a leading vehicle using a series of images recorded by a monocular camera. Japanese Unexamined Patent Application Publication No. 2013-101040A describes a technology for extracting the left and right tail lamps or tires of a leading vehicle as feature points from an image acquired by a digital camera, and estimating the distance between vehicles on the basis of the distance between those feature points.

Additionally, there are various types of pneumatic tires including, for example, summer tires and winter tires. Moreover, there are pneumatic tires of various dimensions. Japanese Unexamined Patent Application Publication No. H09-277806A describes a technology for detecting a color tread identification line provided on a pneumatic tire in order to distinguish the classification of a pneumatic tire in an inspection process.

With systems in which cameras are used, the recognition rate of the vehicle by the camera may decline when it rains. For example, if the road surface is wet due to rain when the tail lamps of a vehicle are extracted as feature points, the possibility of the camera acquiring an image of the tail lamps projected on the road surface increases. If the distance between the vehicles is estimated on the basis of an image of the tail lamps projected on the road surface instead of on the basis of an actual image of the tail lamps, the reliability of the estimation results may decline. Particularly, when it rains at night, the recognition rate of the vehicle by the camera may decline significantly.

SUMMARY

The following vehicle understanding the travel speed of the leading vehicle is effective for avoiding collisions between the vehicles. Systems using millimeter wave sensors and systems using radar sensors can estimate the travel speed of a vehicle. It is desirable that the travel speed of a vehicle can be estimated using an inexpensive monocular camera.

Additionally, the following vehicle understanding information of the pneumatic tires mounted on the leading vehicle is effective for avoiding collisions between the vehicles. It is desirable that the information of the pneumatic tires mounted on a leading vehicle can be understood using an inexpensive monocular camera.

The present technology provides a pneumatic tire whereby, when the distance between vehicles is estimated using an image acquired by a camera, declines in the recognition rate of vehicles by the camera are suppressed, and collisions between the vehicles can be prevented. Additionally, the present technology provides a vehicle whereby declines in the recognition rate of vehicles by a camera are suppressed, and colliding of a following vehicle into a leading vehicle can be prevented.

Furthermore, the present technology provides a pneumatic tire whereby the speed of a leading vehicle is estimated using images acquired by a camera mounted on a vehicle, and collisions between the vehicles can be prevented. Moreover, the present technology provides a vehicle whereby collisions can be prevented.

Additionally, the present technology provides a pneumatic tire whereby information of a pneumatic tire mounted on a leading vehicle is understood using an image acquired by a camera mounted on a vehicle, and collisions between the vehicles can be prevented. Moreover, the present technology provides a vehicle whereby collisions can be prevented.

According to a first aspect of the present technology, a pneumatic tire is provided that includes a surface and is rotatable about a center axis. The surface includes a ground colored region including a surface of rubber, and an image recognition belt region including a colored region provided in a circumferential direction of the center axis.

According to the first aspect of the present technology, an image recognition belt region including a colored region is provided. The colored region is colored with a color by which image recognition at a high recognition rate is possible. Because the colored region is provided, declines in the recognition rate of a pneumatic tire mounted on the vehicle itself by a camera of a following vehicle are suppressed. As a result, colliding of the following vehicle into the vehicle itself is prevented. Additionally, the colored region is provided in the circumferential direction. As such, even while the vehicle itself, on which the pneumatic tire is mounted, is traveling, the colored region of the pneumatic tire of the vehicle itself will be recognized by the camera of the following vehicle at a high recognition rate. Furthermore, the pneumatic tire contacts the road surface. In other words, distance between the road surface and the pneumatic tire is short. Because the pneumatic tire is disposed at a position close to the road surface, even if the camera acquires an image of the pneumatic tire projected onto a wet road surface, errors in the estimation results of the distance between the following vehicle and the vehicle itself, based on the image of the pneumatic tire projected onto the road surface, are suppressed. As a result, declines in the recognition rate of the pneumatic tire mounted on the vehicle itself are suppressed, and colliding of the following vehicle into the vehicle itself is prevented.

Note that here, "image recognition" refers to extracting feature points by analyzing the structure of an image of a pneumatic tire acquired by a camera, and performing recognition of the pneumatic tire. "Recognition rate" refers to a value obtained by [(total number of images−number of misrecognitions)/total number of images], in cases where a camera acquires a plurality of images of a pneumatic tire. Image recognition includes processing such as extraction of image features, and association (pattern matching) of image features and pneumatic tires.

In the first aspect of the present technology, the pneumatic tire may include a main groove provided in the circumferential direction, and the colored region of the image recognition belt region may include an inner surface of the main groove.

As a result, the colored region is sufficiently provided in the circumferential direction. Additionally, contact between the colored region and the road surface is suppressed. As such, the colored region will last a long time.

In the first aspect of the present technology, the inner surface of the main groove may include a bottom surface, a first wall surface, and a second wall surface. The first wall surface is disposed on a first side of the bottom surface in a direction parallel to the center axis. The second wall surface is disposed on a second side of the bottom surface in the direction parallel to the center axis. An angle formed by the first wall surface and the second wall surface may be not less than 30° and not greater than 120°.

As a result, not only the camera of a following vehicle just behind, but also a camera of a following vehicle right behind and a camera of a following vehicle left behind will recognize the pneumatic tire of the vehicle itself at a high recognition rate.

In the first aspect of the present technology, a dimension of the colored region in the direction parallel to the center axis may be 10 mm or greater.

As a result, the pneumatic tire of the vehicle itself will be recognized by the camera of the following vehicle at a high recognition rate.

In the first aspect of the present technology, the colored region of the image recognition belt region may be a speed measurement belt region including a plurality of colored regions provided intermittently in the circumferential direction of the center axis.

As a result, the camera of the following vehicle acquires images of the pneumatic tire at a predetermined frame rate. As such, a rotation speed of the pneumatic tire mounted on the vehicle itself is estimated on the basis of that frame rate and images of the speed measurement belt region acquired at each frame rate. The travel speed of the vehicle itself is estimated by the estimated rotation speed of the pneumatic tire. As a result, colliding of the following vehicle into the vehicle itself is prevented.

In the first aspect of the present technology, dimensions in the circumferential direction of the plurality of colored regions of the speed measurement belt region may differ from each other.

As a result, even if the pneumatic tire rotates at a high speed, the speed measurement belt region will be recognized by the camera of the following vehicle at a high recognition rate.

In the first aspect of the present technology, the speed measurement belt region including the plurality of colored regions provided intermittently in the circumferential direction of the center axis may be a unique information identification belt region for identifying unique information.

As a result, the camera of the following vehicle can acquire images of the plurality of colored regions and the plurality of ground colored regions therebetween in the unique information identification belt region that rotates as a result of traveling. The unique information identification belt region includes unique information of the pneumatic tire. As a result, the following vehicle can acquire unique information of the pneumatic tire mounted on the vehicle itself. Because the unique information of the pneumatic tire mounted on the vehicle itself is understood by the following vehicle, the following vehicle can take measures to avoid colliding with the vehicle itself on the basis of this unique information. As such, colliding of the following vehicle into the vehicle itself is prevented.

In the first aspect of the present technology, the unique information identification belt region may include a one-dimensional bar code formed by a plurality of the colored regions and the ground colored regions for which numbers and dimensions in the circumferential direction are determined on the basis of the unique information.

As a result, an image of the unique information identification belt region that functions as a one-dimensional bar code is acquired by the camera. The camera of the following vehicle, which functions as a bar code reader, can read the one-dimensional bar code provided on the pneumatic tire due to the rotation of the pneumatic tire.

In the first aspect of the present technology, the unique information may include a wear state of the tread portion.

As a result, a safety state of the pneumatic tire, including the wear state of the tread portion, is understood by the following vehicle. When the wear state of the tread portion is great, the vehicle itself on which the pneumatic tire is mounted has a greater possibility of having a longer braking distance, or slipping. Due to the wear state of the tread portion of the pneumatic tire mounted on the vehicle itself being understood by the following vehicle, the following vehicle can take measures to avoid colliding with the vehicle itself. As such, colliding of the following vehicle into the vehicle itself is prevented.

In the first aspect of the present technology, the unique information identification belt region may include a first unique information identification belt region provided on the surface of the tread portion, and a second unique information identification belt region embedded in tread rubber of the tread portion.

As a result, the wear state of the tread portion is understood by the following vehicle. During the initial period of wear of the tread rubber of the tread portion, the colored regions of the first unique information identification belt region are disposed on the surface of the tread portion. An image of the first unique information identification belt region is acquired by the camera of the following vehicle. During the initial period of wear of the tread rubber, the second unique information identification belt region is embedded in the tread rubber. Accordingly, during the initial period of wear of the tread rubber, the camera of the following vehicle acquires an image of the first unique information identification belt region, and does not acquire an image of the second unique information identification belt region. Because the camera of the following vehicle acquires an image of the first unique information identification belt region, the following vehicle can understand that the tread rubber of the tread portion of the pneumatic tire of the vehicle itself is in an initial period of wear. The tread rubber of the tread portion of the pneumatic tire wears as a result of traveling. During the intermediate period of wear and terminal stage of wear of the tread rubber, the first unique information identification belt region disappears and the colored regions of the second unique information identification belt region become disposed on the surface of the tread portion. An image of the second unique information identification belt region is acquired by the camera of the following vehicle. During the intermediate period of wear and the terminal stage of wear of the tread rubber, the first unique information identification belt region has disappeared. Accordingly, during the intermediate period of wear and the terminal stage of wear of the tread rubber, the camera of the following vehicle acquires an image of the second unique information identification belt region, and does not acquire an image of the first unique information identification belt region. Because the camera of the following vehicle acquires an image of the second unique information identification belt region, the following vehicle can understand that the tread rubber of the tread portion of the pneumatic tire of the vehicle itself is in an intermediate period of wear or a terminal stage of wear.

In the first aspect of the present technology, the unique information may include at least one of a tire manufacturing date, a maximum tire traveling speed, a tire dimension, a tire type, or a tire performance.

As a result, the following vehicle will understand various information of the pneumatic tire mounted on the vehicle itself. For example, in cases where a long period of time has passed since the tire manufacturing date, the vehicle itself has a high possibility that the performance of the pneumatic tire has deteriorated, and the vehicle itself has a high possibility of having problems stably traveling. In cases where the following vehicle acquires information indicating the tire manufacturing date and determines that the amount of time passed since the tire manufacturing date is longer than a predetermined threshold value, the following vehicle can take measures to avoid colliding with the vehicle itself on the basis of the information indicating the tire manufacturing date Additionally, in cases where the vehicle itself is traveling at the maximum traveling speed of the pneumatic tire or faster, the vehicle itself has a high possibility of having problems stably traveling. In cases where the following vehicle acquires information indicating the maximum traveling speed and determines that the vehicle itself is traveling at a travel speed greater than or equal to the maximum traveling speed of the pneumatic tire, the following vehicle can take measures to avoid colliding with the vehicle itself on the basis of the information indicating the maximum traveling speed. The tire dimensions include, for example, at least one of a total tire width, a tire circumferential length, a tire outer diameter, a tire rim diameter, or an aspect ratio. Because information indicating the tire dimensions such as the total tire width, the tire circumferential length, the tire outer diameter, the tire rim diameter, and the aspect ratio is acquired by the following vehicle, the following vehicle can determine whether or not the vehicle itself is traveling in a manner suitable to the tire dimensions. In cases where it is determined that the vehicle itself is not traveling in a manner suitable to the tire dimensions, the following vehicle can take measures to avoid colliding with the vehicle itself on the basis of the information indicating the tire dimensions. Additionally, because information indicating the tire types is acquired by the following vehicle, the following vehicle can determine whether or not a pneumatic tire of an appropriate tire type is mounted on the vehicle itself. Examples of tire types include the classifications of summer tires, winter tires, all-season tires, snow tires, studded tires, and studless tires. For example, in cases where summer tires are mounted on the vehicle itself even though it is winter, the vehicle itself has a high possibility of having problems stably traveling. In cases where the following vehicle acquires information indicating the tire type and determines that a summer tire is mounted on the vehicle itself even though it is winter, the following vehicle can take measures to avoid colliding with the vehicle itself on the basis of the information indicating the tire type. Additionally, because information indicating the tire performance is acquired by the following vehicle, the following vehicle can determine whether or not a pneumatic tire with appropriate tire performance is mounted on the vehicle itself. Examples of tire performance include wet grip performance stipulated by Japan Automobile Tyre Manufacturers Association (JATMA). In cases where a pneumatic tire with low grip performance is mounted on the vehicle itself even though it is raining, the vehicle itself has a high possibility of having problems stably traveling. In cases where the following vehicle acquires information indicating the tire performance and determines that a pneumatic tire with low grip performance is mounted on the vehicle itself even though it is raining, the following vehicle can take measures to avoid colliding with the vehicle itself on the basis of the information indicating the tire performance. Additional examples of the tire performance include the load index of the pneumatic tire. Because information indicating the load index is acquired by the following vehicle, the following vehicle can determine whether or not the vehicle itself is traveling in a manner suitable to the load index. In cases where it is determined that the vehicle itself is not traveling in a manner suitable to the load index, the following vehicle can take measures to avoid colliding with the vehicle itself on the basis of the information indicating the load index.

In the first aspect of the present technology, the unique information may include unique information of the vehicle on which the pneumatic tire is to be mounted.

As a result, the following vehicle will understand various information of the vehicle itself on which the pneumatic tire is mounted. Examples of the unique information of the vehicle itself on which the pneumatic tire is mounted include information indicating the vehicle weight of the vehicle and information indicating dimensions of the vehicle. For example, in cases where vehicle weight is great, the vehicle itself has a high possibility of having a longer braking distance. In cases where the following vehicle acquires information indicating the vehicle weight of the vehicle itself and determines that the vehicle weight of the vehicle itself is longer than a predetermined threshold value, the following vehicle can take measures to avoid colliding with the vehicle itself on the basis of the information indicating the vehicle weight of the vehicle itself. Additionally, the running performance of the vehicle itself may change depending on the dimensions of the vehicle itself such as the tread width or the wheel base. The following vehicle acquires information indicating the dimensions of the vehicle itself and, thereby, can predict the running performance of the vehicle itself and take measures to avoid colliding with the vehicle itself.

In the first aspect of the present technology, reflectance of the colored regions with respect to visible light may be greater than reflectance of the ground colored regions.

As a result, the colored regions will be recognized by the camera at a high recognition rate. For example, even when raining at night, the colored regions will be recognized by the camera at a high recognition rate.

In the first aspect of the present technology, the pneumatic tire may include a shoulder portion, and the colored regions may be provided on a surface of the shoulder portion.

As a result, contact between the colored regions and the road surface is suppressed. As such, the colored regions will last a long time. Additionally, in cases where the pneumatic tire is mounted on the vehicle itself, not only the camera of a following vehicle just behind, but also a camera of a following vehicle right behind and a camera of a following vehicle left behind will recognize the pneumatic tire of the vehicle itself at a high recognition rate.

In the first aspect of the present technology, the colored regions may include a surface of a coating material applied on the rubber.

As a result, the degree of freedom of selecting materials is improved, and colored regions having a desired reflectance, a desired brightness, and a desired contrast with the ground colored regions can be easily provided.

In the first aspect of the present technology, the coating material may include a fluorescent coating material.

As a result, even at night or when it rains, the pneumatic tire of the vehicle itself will be recognized by the camera of the following vehicle at a high recognition rate.

In the first aspect of the present technology, the coating material may include a retroreflective material.

As a result, the pneumatic tire of the vehicle itself will be recognized by the camera of the following vehicle at a high recognition rate.

In the first aspect of the present technology, the pneumatic tire may include colored rubber containing a colorant, and the colored regions may include a surface of the colored rubber.

As a result, a pneumatic tire including a colored region can be easily manufactured.

According to a second aspect of the present technology, a vehicle is provided that include a plurality of wheels and, a pneumatic tire of the first aspect mounted on at least a rearmost wheel of the plurality of wheels.

According to the second aspect of the present technology, the vehicle (the vehicle itself), on which the pneumatic tire is mounted on the rearmost wheel, will be recognized by the camera of the following vehicle at a high recognition rate. As such, colliding of the following vehicle into the vehicle itself is prevented.

In the second aspect of the present technology, the vehicle may include a lighting device configured to illuminate the pneumatic tire mounted on the rearmost wheel.

As a result, even at night, the pneumatic tire of the vehicle itself will be recognized by the camera of the following vehicle at a high recognition rate.

According to an aspect of the present technology, a pneumatic tire is provided whereby declines in the recognition rate of vehicles by a camera are suppressed, and collisions between vehicles can be prevented. Additionally, according to an aspect of the present technology, a vehicle is provided whereby declines in the recognition rate of vehicles by a camera are suppressed, and colliding of a following vehicle into a leading vehicle can be prevented.

Furthermore, according to an aspect of the present technology, a pneumatic tire is provided whereby the speed of a leading vehicle is estimated using an image acquired by a camera mounted on a vehicle, and collisions between the vehicles can be prevented. Additionally, according to an aspect of the present technology, a vehicle is provided whereby collisions can be prevented.

Additionally, according to an aspect of the present technology, a pneumatic tire is provided whereby information of a pneumatic tire mounted on a leading vehicle is understood using an image acquired by a camera mounted on a vehicle, and collisions between the vehicles can be prevented. Furthermore, according to an aspect of the present technology, a vehicle is provided whereby collisions can be prevented.

DETAILED DESCRIPTION

Embodiments according to the present technology will be described with reference to the appended drawings. However, the present technology is not limited to those embodiments. The constituents of the embodiments described below can be combined with one another as appropriate. In addition, some of the constituents may not be used in some cases.

In the description below, an X-Y-Z Cartesian coordinates system is used, and a positional relationship of each portion is described with reference to the X-Y-Z Cartesian coordinates system. One of directions in a horizontal plane is defined as an X-axis direction, a direction orthogonal to the X-axis direction in the horizontal plane is defined as a Y-axis direction, and a direction orthogonal to each of the X-axis direction and the Y-axis direction is defined as a Z-axis direction. Furthermore, rotational (inclination) directions around the X axis, Y axis, and the Z axis are defined as directions θX, θY, and θZ, respectively.

First Embodiment

Figure 1:
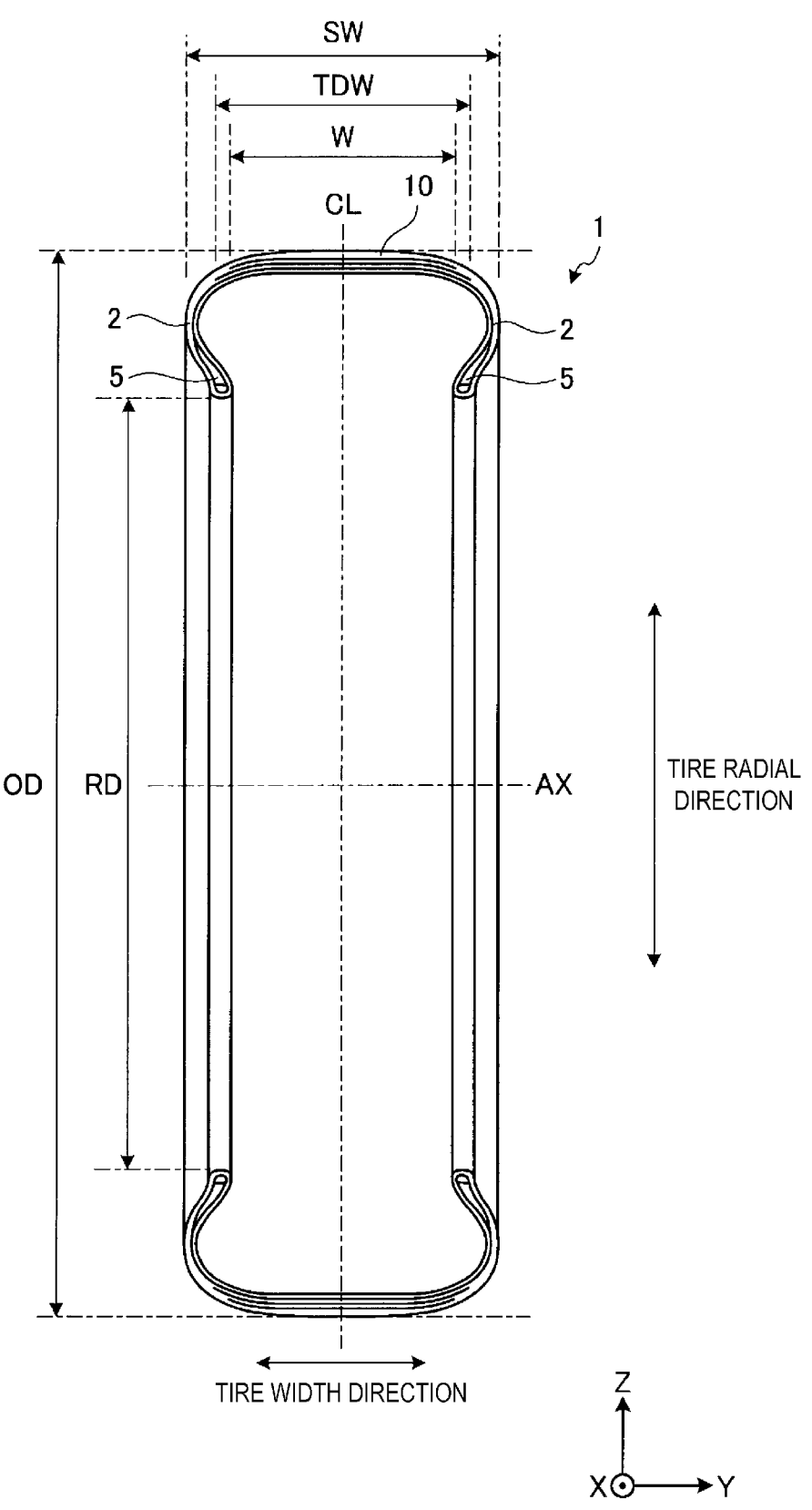
FIG. 1 is a cross-sectional view illustrating an example of a pneumatic tire according to a first embodiment.
Figure 2:
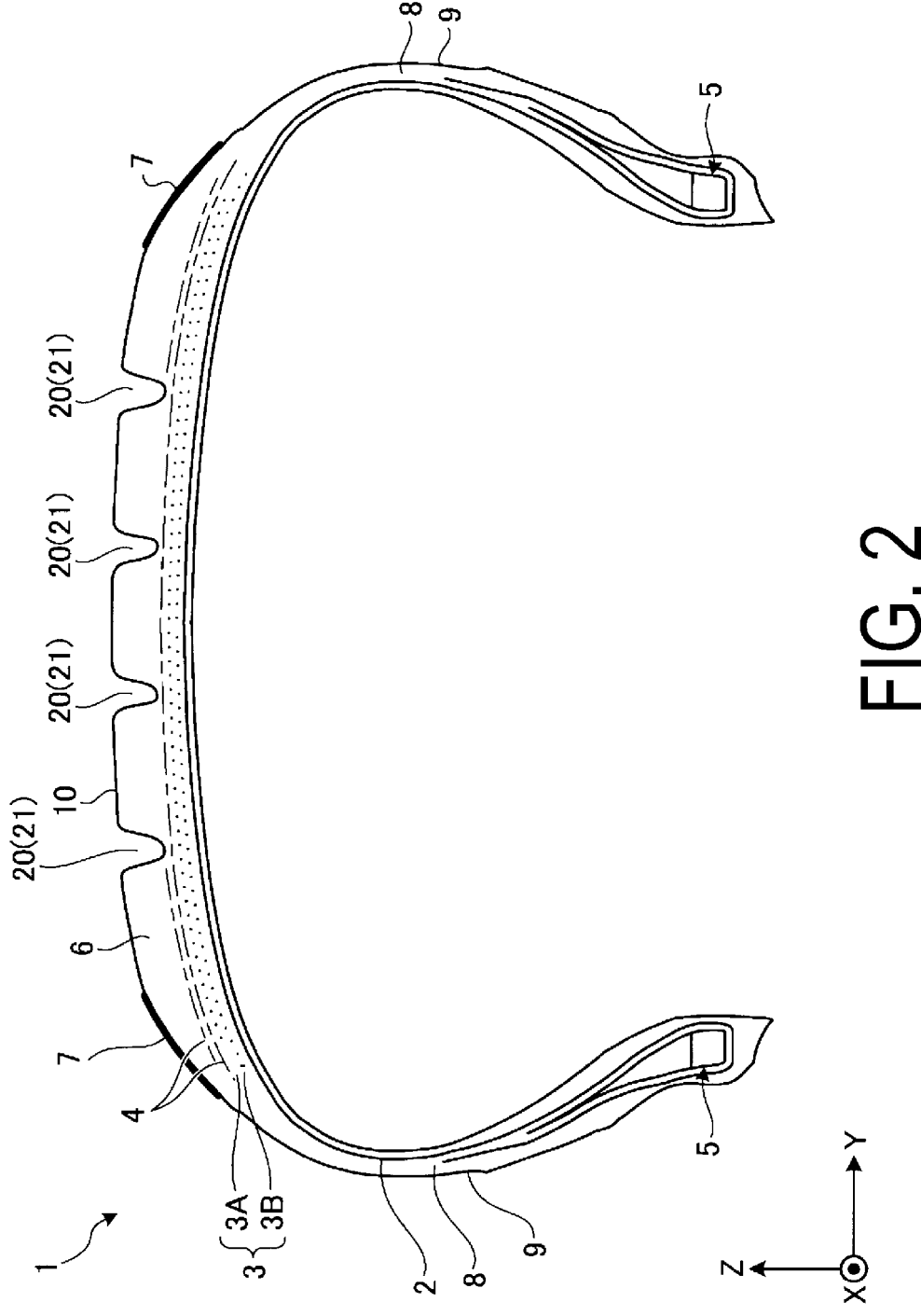
FIG. 2 is an enlarged cross-sectional view of a portion of the pneumatic tire according to the first embodiment.

A first embodiment will be described. FIG. 1 is a cross-sectional view illustrating an example of a pneumatic tire 1 according to the present embodiment. FIG. 2 is an enlarged cross-sectional view of a portion of the pneumatic tire 1 according to the present embodiment. In the description below, the pneumatic tire 1 is also referred to as tire 1 for convenience.

The tire 1 is capable of rotation about a center axis (rotation axis) AX. FIGS. 1 and 2 each illustrate a meridian cross-section taken through the center axis AX of the tire 1. The center axis AX of the tire 1 is orthogonal to an equatorial plane CL of the tire 1.

In the present embodiment, the center axis AX of the tire 1 is parallel to the Y axis. That is, in the present embodiment, a direction parallel to the center axis AX is the Y-axis direction. The Y-axis direction is a vehicle width direction or a width direction of the tire 1. The equatorial plane CL passes through the center in the Y-axis direction of the tire 1. The direction θY is a rotation direction of the tire 1 (the center axis AX). The X-axis direction and the Z-axis direction are radiation directions with respect to the center axis AX. Road surfaces (the ground) on which the tire 1 travels (rolls) are substantially parallel to the XY plane.

In the description below, for convenience sake, the rotation direction of the tire 1 (the center axis AX) is referred to as the "circumferential direction", the radiation direction with respect to the center axis AX is referred to as the "radial direction", and the direction parallel to the center axis AX is referred to as the "width direction".

The tire 1 includes a carcass portion 2, a belt layer 3, a belt cover 4, bead portions 5, a tread portion 10, and sidewall portions 9. The tread portion 10 includes tread rubber 6. The sidewall portions 9 include sidewall rubber 8. The carcass portion 2, the belt layer 3, and the belt cover 4 each include cords. The cords are reinforcing members. The cords may be referred to as "wires". The layers that include the reinforcing members such as the carcass portion 2, the belt layer 3, and the belt cover 4 may each be referred to as a "cord layer" or a "reinforcing member layer".

The carcass portion 2 is a reinforcing member that forms a framework for the tire 1. The carcass portion 2 includes cords. The cords of the carcass portion 2 may be referred to as "carcass cords". The carcass portion 2 functions as a pressure vessel when the tire 1 is filled with air. The carcass portion 2 is supported by the bead portions 5. The bead portions 5 are disposed at both sides of the carcass portion 2 in the Y-axis direction. The carcass portion 2 is folded back at the bead portions 5. The carcass portion 2 includes organic fiber carcass cords and rubber covering the carcass cords.

Note that the carcass portion 2 may include polyester carcass cords, may include nylon carcass cords, may include aramid carcass cords, and may include rayon carcass cords.

The belt layer 3 is a reinforcing member for retaining the shape of the tire 1. The belt layer 3 includes cords. The cords of the belt layer 3 may be referred to as "belt cords". The belt layer 3 is disposed between the carcass portion 2 and the tread rubber 6. The belt layer 3 includes, for example, metal fiber belt cords made from steel or the like, and rubber covering the belt cords. Note that the belt layer 3 may include organic fiber belt cords. In the present embodiment, the belt layer 3 includes a first belt ply 3A and a second belt ply 3B. The first belt ply 3A and the second belt ply 3B are layered such that the cords of the first belt ply 3A and the cords of the second belt ply 3B cross.

The belt cover 4 is a reinforcing member for protecting and reinforcing the belt layer 3. The belt cover 4 includes cords. The cords of the belt cover 4 may be referred to as "cover cords". The belt cover 4 is disposed outward of the belt layer 3 with respect to the center axis AX of the tire 1. The belt cover 4 includes, for example, metal fiber cover cords made from steel or the like, and rubber covering the cover cords. Note that the belt cover 4 may include organic fiber cover cords.

The bead portions 5 are reinforcing members for fixing both ends of the carcass portion 2. The bead portions 5 fix the tire 1 to the rim. The bead portions 5 are bundles of steel wires. Note that the bead portions 5 may be bundles of carbon steel.

The tread rubber 6 protects the carcass portion 2. The tread rubber 6 includes the tread portion 10 and a plurality of grooves 20 provided in the tread portion 10. The tread portion 10 includes a ground contact portion that contacts the road surface. The tread portion 10 includes land portions disposed between the grooves 20.

The sidewall rubber 8 protects the carcass portion 2. The sidewall rubber 8 is disposed on both sides of the tread rubber 6 in the Y-axis direction. The sidewall rubber 8 includes the sidewall portions 9 disposed on both sides of the tread portion 10 in the Y-axis direction.

In the present embodiment, the tire outer diameter is indicated by the reference sign "OD". The tire rim diameter is indicated by the reference sign "RD". The total tire width is indicated by the reference sign "SW". The tread ground contact width is indicated by the reference sign "W". The developed tread width is indicated by the reference sign "TDW".

Herein, the "tire outer diameter OD" refers to the diameter of the tire 1 when the tire 1 is mounted on a specified rim, the tire 1 is rim assembled on a regular rim, inflated to a regular internal pressure, and in an unloaded state.

Herein, the "tire rim diameter RD" refers to the rim diameter of a wheel compatible with the tire 1. The tire rim diameter RD is equivalent to the tire inner diameter.

Herein, the "total tire width SW" refers to the maximum dimension of the tire 1 in a direction parallel to the center axis AX when the tire 1 is rim assembled on a regular rim, inflated to a regular internal pressure, and is in an unloaded state. Specifically, the "total tire width SW" refers to a distance from the farthest portion to the +Y side of the sidewall portion 9 disposed on the +Y side of the tread rubber 6 to the farthest portion to the −Y side of the sidewall portion 9 disposed on the −Y side. In cases where a structure protruding from the surface of the sidewall portion 9 is provided on the surface of the sidewall portion 9, the "total tire width SW" refers to the maximum dimension of the tire 1 in the Y-axis direction including this structure. The structure protruding from the surface of the sidewall portion 9 includes at least one of alphanumerics, marks, or designs formed by at least a portion of the sidewall rubber 8 on the sidewall portion 9.

In the present embodiment, the "tread ground contact width W" refers to the maximum value of the ground contact width in a direction parallel to the center axis AX of the tire 1 as measured when the tire 1 is rim assembled on a regular rim, inflated to a regular internal pressure, and placed vertically upon a flat surface with a regular load applied thereto.

In the present embodiment, the "developed tread width TDW" refers to the linear distance between both ends in a developed view of the tread portion 10 of the tire 1 when the tire 1 is rim assembled on a regular rim, inflated to a regular internal pressure, and is in an unloaded state.

A "regular rim" is a rim defined by a standard for each tire 1 according to a system of standards that includes standards on which tires 1 are based, and refers to a "standard rim" in the case of Japan Automobile Tyre Manufacturers Association (JATMA), refers to a "Design Rim" in the case of Tire and Rim Association (TRA), and refers to a "Measuring Rim" in the case of European Tyre and Rim Technical Organisation (ETRTO). If the tire 1 is a tire to be mounted on a new vehicle, the genuine wheel upon which the tire is to be fitted is used.

"Regular internal pressure" is the air pressure defined by standards for each tire 1 according to a system of standards that includes standards on which tires 1 are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. However, the air pressure which is displayed on the vehicle is used in a case where the tire 1 is a tire to be mounted on a new car.

"Regular load" is the load defined by standards for each tire 1 according to a system of standards that includes standards on which tires 1 are based, and refers to "maximum load capacity" in the case of JATMA, to the maximum value in the table of "TIRE ROAD LIMITS AT VARIOUS COLD INFLATION PRESSURES" in the case of TRA, and to "LOAD CAPACITY" in the case of ETRTO. If the tire is for use on a passenger vehicle, a load corresponding to 88% of the loads described above is used. In the case of a tire 1 to be mounted on a new vehicle, the wheel load shall be calculated by dividing the each of the front and rear axle loads stated in the vehicle inspection certificate of the vehicle by the number of tires.

Figure 3:
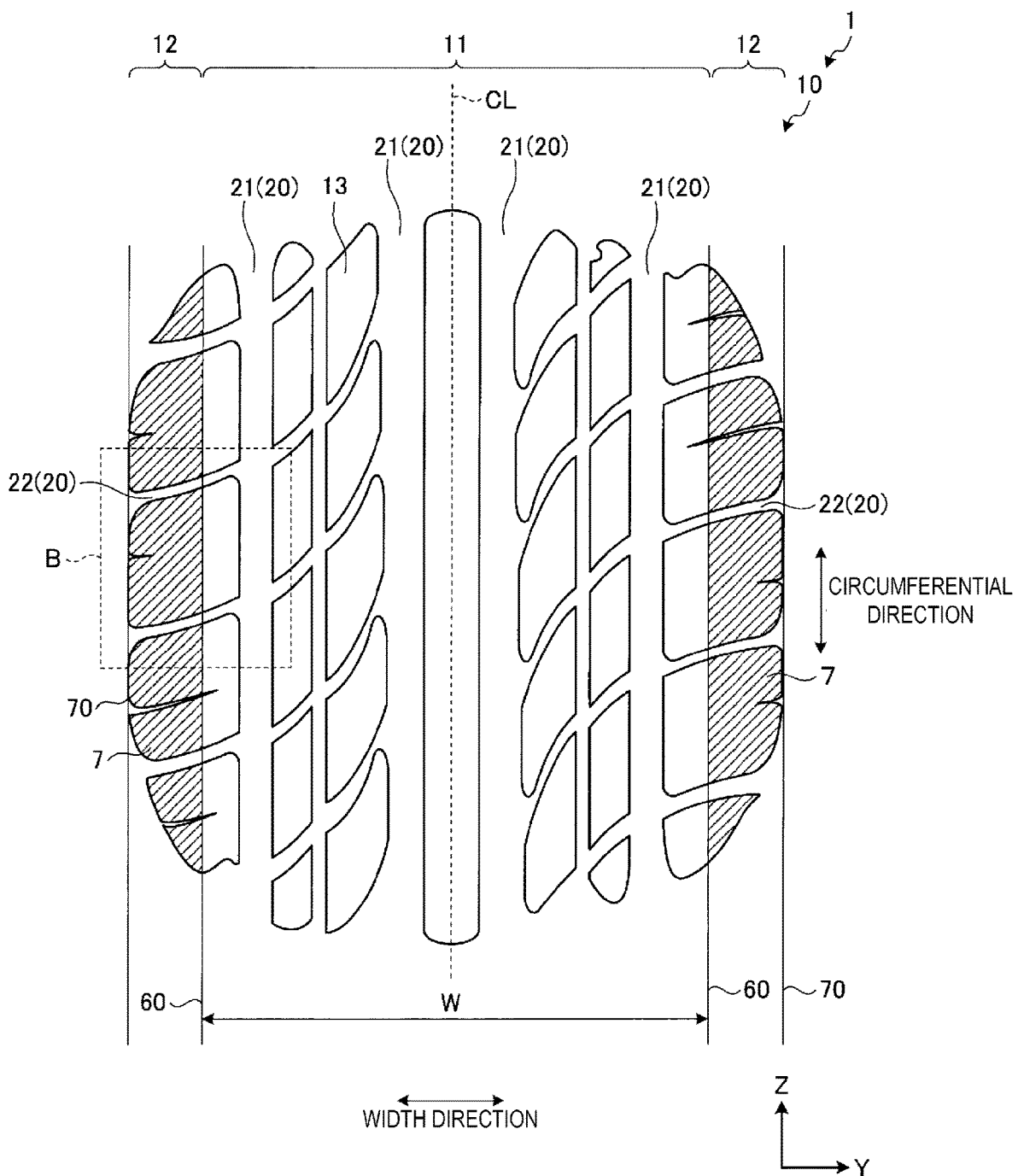
FIG. 3 is a drawing illustrating an example of a tread portion of the pneumatic tire according to the first embodiment.
Figure 4:
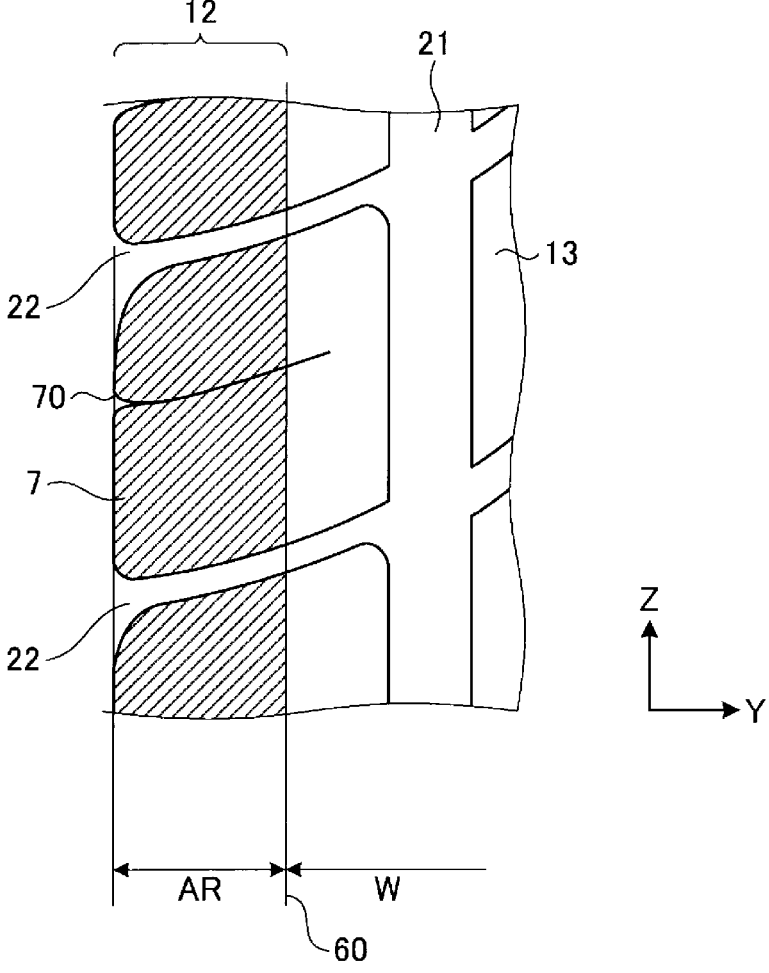
FIG. 4 is an enlarged drawing of portion B in FIG. 3.

FIG. 3 is a drawing illustrating an example of the tread portion 10 of the tire 1. FIG. 4 is an enlarged drawing of portion B in FIG. 3. As illustrated in FIGS. 2, 3, and 4, the tire 1 includes the tread portion 10. The tread portion 10 includes a center portion 11, and shoulder portions 12 disposed on both sides in the Y-axis direction of the center portion 11.

The tire 1 includes grooves 20 provided in the tread portion 10. The grooves 20 include main grooves 21 extending in the circumferential direction of the tire 1, and lug grooves (lateral grooves) 22 of which at least a portion thereof extends in the width direction of the tire 1. Land portions are provided around the grooves 20. The land portions are provided between one groove 20 and another groove 20 adjacent to the one groove 20. The tread portion 10 includes a plurality of the land portions.

The main grooves 21 are provided in the circumferential direction of the tire 1. At least a portion of the main grooves

21 is provided in the center portion 11 of the tread portion 10. The main grooves 21 are provided with tread wear indicators in interior portions thereof. The tread wear indicators indicate the terminal stage of wear. The main grooves 21 may have a width of 4.0 mm or greater and a depth of 5.0 mm or greater. In the example illustrated in FIGS. 2 and 3, the tire 1 includes 4 of the main grooves 21.

At least a portion of the lug grooves 22 is provided in the width direction of the tire 1. At least a portion of the lug grooves 22 is provided in the shoulder portions 12 of the tread portion 10. The shoulder portions 12 are disposed on both sides (the +Y side and the −Y side) in the width direction (the Y-axis direction) of the center portion 11. The lug grooves 22 have a width of 1.5 mm or greater. The lug grooves 22 may have a depth of 4.0 mm or greater, and may have portions with a depth of less than 4.0 mm.

In the present embodiment, a colored region 7 is provided on at least a portion of the surface of the tire 1. In the present embodiment, the surface of the tire 1 includes the surface of the tread portion 10 and the surface of the sidewall portions 9. The surface of the tread portion 10 includes the surface of the center portion 11, the surface of the shoulder portions 12, and the inner surface of the grooves 20.

The colored region 7 is provided on a portion of the surface of the tire 1. The surface of the tire 1 other than the colored region 7 is a ground colored region 13. The color of the ground colored region 13 is the color of the foundation of the colored region 7. The ground colored region 13 includes the surface of the rubber of the tire 1, including the tread rubber 6 and the sidewall rubber 8. The color of the ground colored region 13 is the color of that rubber. The surface of the tire 1 includes the ground colored region 13 including the surface of the rubber, and the colored region 7 of a color different than the color of the ground colored region 13. The colored region 7 is formed by coloring the foundation of the tire 1, such as the rubber.

The colored region 7 is a region for image recognition. Images of the tire 1 are acquired by a camera. The color of the colored region 7 is a color whereby a camera can perform image recognition at a high recognition rate.

Note that here, "image recognition" refers to extracting feature points by analyzing the structure of an image of the tire 1 acquired by a camera, and performing recognition of the tire 1. "Recognition rate" refers to a value obtained by [(total number of images−number of misrecognitions)/(total number of images)], in cases where a camera acquires a plurality of images of the tire 1. Image recognition includes processing such as extraction of image features, and association (pattern matching) of image features and the tire 1.

Reflectance of the colored region 7 with respect to visible light is greater than reflectance of the ground colored region 13 with respect to visible light. The hue of the ground colored region 13 is black. The hue of the colored region 7 is, for example, at least of one of yellow, beige, brown, red, green, blue, gray, and white. Note that, herein, the "reflectance of the surface (the colored region 7 or the ground colored region 13) of the tire 1" refers to the reflectance of the color diffusing surface. In the present embodiment, the "reflectance" is total light reflectance as measured in accordance with the method specified in JIS K-7375.

Note that, as shown in JIS Z 8721-1993, reflectance increases when the Munsell brightness is high. Accordingly, a configuration is possible in which the hue of the colored region 7 and the hue of the ground colored region 13 are the same and the brightness (Munsell brightness) differs. That is, the brightness of the colored region 7 may be adjusted with respect to the brightness of the ground colored region 13 such that the reflectance of the colored region 7 with respect to visible light is greater than the reflectance of the ground colored region 13.

Because the reflectance of the colored region 7 with respect to visible light is greater than reflectance of the ground colored region 13 with respect to visible light, the colored region 7 will be recognized by a camera at a high recognition rate.

In the present embodiment, the colored region 7 is provided in the circumferential direction. The colored region 7 is disposed on the periphery of the center axis AX. In other words, the colored region 7 does not break and is provided continuously in the circumferential direction. Note that the colored region 7 may be disposed on a portion of the periphery of the center axis AX.

As illustrated in FIGS. 3 and 4, in the present embodiment, the colored region 7 is provided on the surface of the shoulder portions 12.

The surface of the shoulder portions 12 includes a surface of the tire 1 between an edge portion (ground contact edge portion) 60 of the ground contact region of the tread portion 10 in the Y-axis direction and a terminating portion 70 of the lug grooves 22 disposed outward in the Y-axis direction of the ground contact edge portion 60. In the description below, in the surface of each of the shoulder portions 12, the region between the ground contact edge portion 60 and the terminating portion 70 is referred to as the "shoulder portion AR" for convenience.

In the present embodiment, the colored region 7 is provided in the shoulder regions AR. The colored region 7 is provided continuously in the circumferential direction in the shoulder regions AR.

Herein, the "ground contact edge portion 60" refers to an edge portion of the tread ground contact width W. As described above, the "tread ground contact width W" refers to the maximum value of the ground contact width in a direction parallel to the center axis AX as measured when the tire 1 is rim assembled on a regular rim, inflated to a regular internal pressure, and placed vertically upon a flat surface with a regular load applied thereto.

The shoulder portions 12 (the shoulder regions AR) are disposed on both sides of the center portion 11 in the Y-axis direction. The colored region 7 may be provided on the shoulder portions 12 on both sides of the center portion 11, or may be provided on one of the shoulder portions 12.

In the present embodiment, a dimension of the colored region 7 in the Y-axis direction is 10 mm or greater. The dimension of the colored region 7 in the Y-axis direction may be 15 mm or greater.

In the present embodiment, the colored region 7 includes the surface of a coating material applied to the foundation, namely the rubber. That is, in the present embodiment, the colored region 7 is formed by applying a coating material to the surface of the foundation, namely the rubber of the tire 1. In the present embodiment, in the surface of the tread rubber 6, the coating material is applied to regions corresponding to the shoulder portions 12. As a result, the colored region 7 is provided on the shoulder portions 12.

In the present embodiment, an applied coating material has a reflectance with respect to visible light, which is greater than that of the rubber (the tread rubber 6). The hue or the Munsell brightness of the coating material is selected for increasing the reflectance with respect to visible light so as to be greater than that of the rubber.

Note that the coating material may be a fluorescent coating material. Herein, "fluorescent coating material" refers to a coating material in which a fluorescent substance is used as a pigment. The fluorescent substance included in the fluorescent coating material emits fluorescent light when stimulated by ultraviolet rays.

Note that the coating material may be a luminescent coating material. Herein, "luminescent coating material" refers to coating materials that contain, as a main pigment, a fluorescent substance or phosphor with properties whereby the energy of electromagnetic waves with wavelengths shorter than visible light or ultraviolet light is converted to visible light. The luminescent coating material may be a light-storing coating material or a light-emitting coating material.

Additionally, the coating material may include a diffusible material. The diffusible material includes metal or glass microparticles.

Additionally, the coating material may include a retroreflective material. That is, the coating material may be a so-called retroreflective coating material. The retroreflective material is formed from a transparent resin layer including spherical, transparent reflective beads, for which a reflective film is formed on a portion of the surfaces of the reflective beads.

Figures 5, 6:
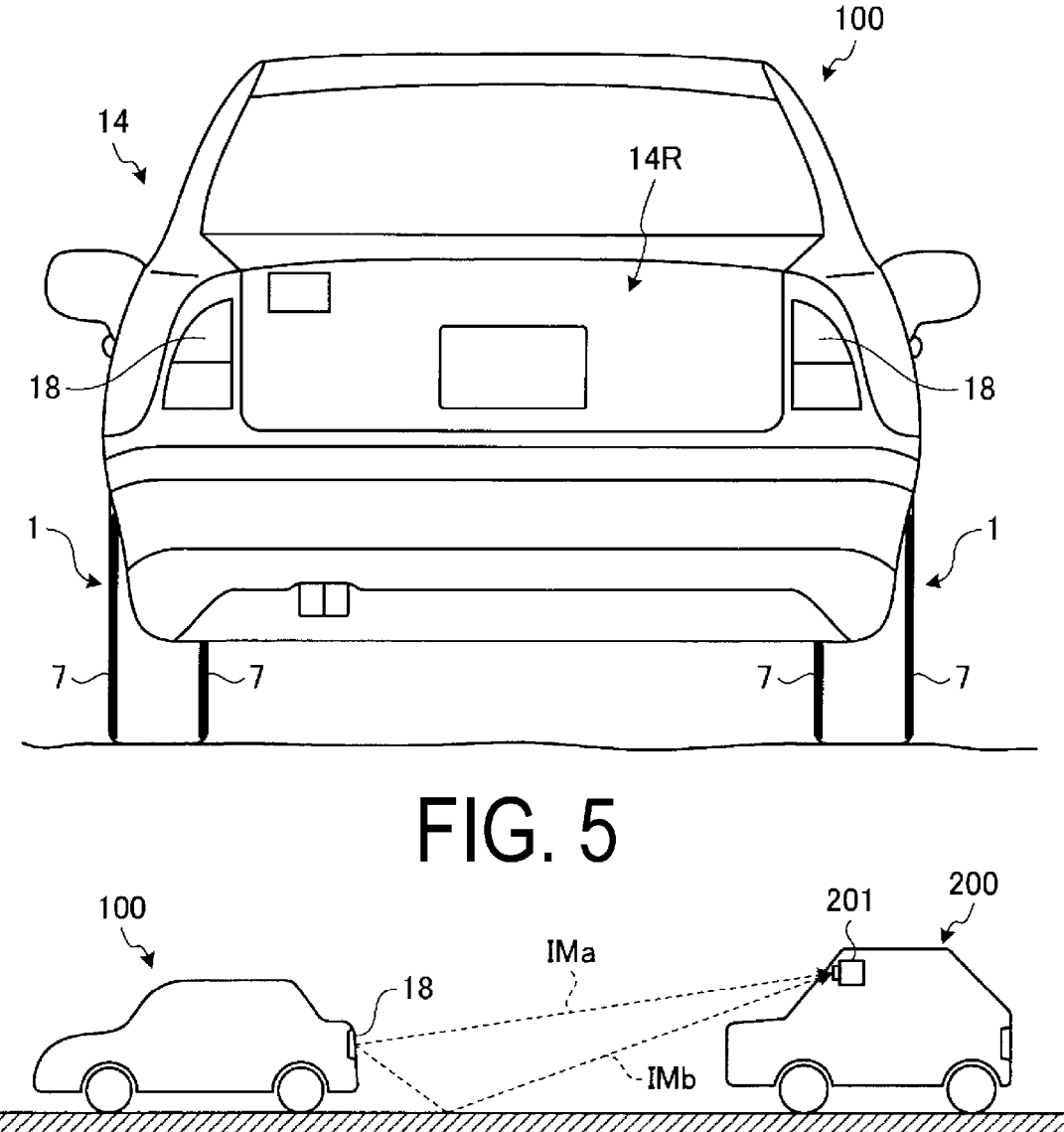
FIG. 5 is a drawing illustrating an example of a vehicle on which the pneumatic tire according to the first embodiment is mounted.
FIG. 6 is a drawing schematically illustrating a relationship between a vehicle itself and a following vehicle according to a comparative example.

FIG. 5 is a drawing illustrating an example of a vehicle 100 on which the tire 1 that includes the colored region 7 is mounted. FIG. 5 is a drawing of the vehicle 100, as viewed from behind the vehicle 100. As illustrated in FIG. 5, the vehicle 100 includes a vehicle body 14, tail lamps 18 disposed on a rear portion 14R of the vehicle body 14, and the tires 1.

The vehicle 100 has a plurality of wheels. In the present embodiment, the vehicle 100 is a four-wheel automobile that has four wheels. The vehicle 100 has front wheels and rear wheels. As illustrated in FIG. 5, the tire 1 is mounted on at least the rearmost wheel (the rear wheels in this example).

FIG. 6 is a schematic drawing illustrating an example of a relationship between the vehicle (vehicle itself) 100 leading on a road surface and a vehicle (following vehicle) 200 behind the vehicle 100. FIG. 6 is a drawing according to a comparative example. The following vehicle 200 is provided with a collision aversion system for avoiding collisions (rear end collisions) with the vehicle itself 100. A camera 201 for detecting distance (inter-vehicular distance) between the vehicle itself 100 and the following vehicle 200 is mounted on the following vehicle 200. The camera 201 acquires an image of the vehicle itself 100. The collision avoidance system of the following vehicle 200 extracts feature points of the vehicle itself 100 from the image of the vehicle itself 100 acquired by the camera 201, and estimates the distance between the vehicle itself 100 and the following vehicle 200 on the basis of the extracted feature points.

FIG. 6 illustrates an example in which the tail lamps 18 of the vehicle itself 100 are extracted as feature points of the vehicle itself 100. The positions of the tail lamps 18 and the position of the road surface are separated in the height direction.

The camera 201 of the following vehicle 200 acquires an actual image IMa of the tail lamps 18 of the vehicle itself 100. As a result, the collision avoidance system of the following vehicle 200 can recognize the vehicle itself 100 and estimate the distance between the vehicle itself 100 and the following vehicle 200.

In cases where the tail lamps 18 of the vehicle itself 100 are extracted as the feature points, when, for example, it is raining, the recognition rate of the vehicle itself 100 by the camera 201 may decline. As illustrated in FIG. 6, the tail lamps 18 are separated from the road surface in the height direction. If the road surface is wet due to rain and the tail lamps 18 of the vehicle itself 100 are extracted as feature points, the possibility of the camera 201 acquiring an image IMb of the tail lamps 18 projected on the road surface increases. If the distance between the vehicle itself 100 and the following vehicle 200 is estimated on the basis of the image IMb of the tail lamps 18 projected on the road surface instead of on the basis of the actual image IMa of the tail lamps 18, the reliability of the estimation results may decline. Particularly, when it rains at night, the recognition rate of the vehicle itself 100 by the camera 201 may decline significantly.

That is, if locations where the distance in the height direction from the road surface is great are extracted as the feature points, a difference between the optical path length of the image IMa from the feature points (the tail lamps 18 in this example) to the camera 201 and the optical path length of the image IMb will increase, and the depression angle from the camera 201 will change, resulting in the positions of the feature points in the entire image changing. As a result, the reliability of the estimation results of the distance between the vehicle itself 100 and the following vehicle 200 may decline, regardless of the method of image recognition.

Figure 7:
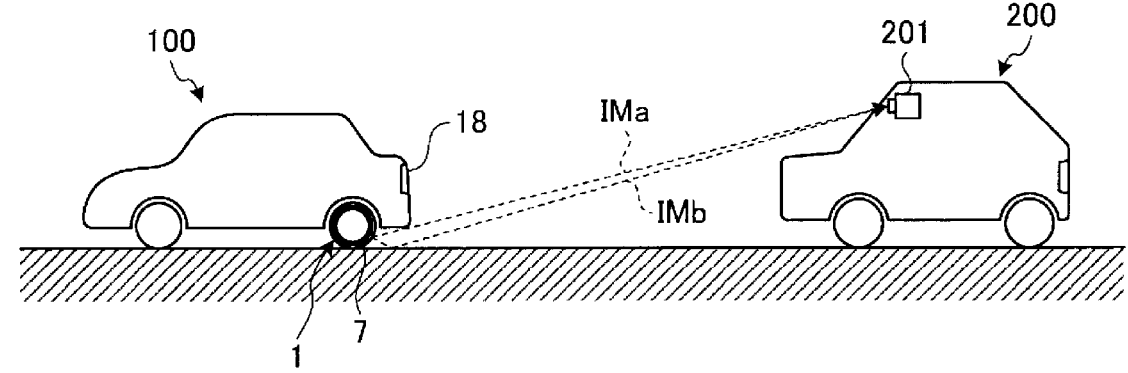
FIG. 7 is a drawing schematically illustrating a relationship between a vehicle itself and a following vehicle according to the first embodiment.

FIG. 7 is a schematic drawing illustrating an example of the relationship between the vehicle itself 100 on which the tire 1 of the present embodiment is mounted, and the following vehicle 200 on which the camera 201 is mounted. FIG. 7 illustrates an example in which the tire 1 of the vehicle itself 100 is extracted as the feature point of the vehicle itself 100. The tire 1 contacts the road surface. As such, the distance in the height direction between the position of the tire 1 and the position of the road surface is short.

The camera 201 of the following vehicle 200 acquires an actual image IMa of the tire 1 of the vehicle itself 100. As a result, the collision avoidance system of the following vehicle 200 can recognize the vehicle itself 100 and estimate the distance between the vehicle itself 100 and the following vehicle 200.

As illustrated in FIG. 7, the tire 1 contacts the road surface in the height direction. In cases where the tire 1 of the vehicle itself 100 is extracted as the feature point, for example, even in a case where the camera 201 acquires an image IMb of the tire 1 projected on a road surface that is wet due to rain, errors in the estimation results of the distance between the vehicle itself 100 and the following vehicle 200, based on the image IMb of the tire 1 projected onto the road surface, are suppressed.

That is, if a location where the distance in the height direction from the road surface is small is extracted as the feature point, the difference between the optical path length of the image IMa from the feature point (the tire 1 in this example) to the camera 201 and the optical path length of the image IMb will decrease. As a result, declines in the reliability of the estimation results of the distance between the vehicle itself 100 and the following vehicle 200 are suppressed.

Furthermore, in the present embodiment, the tire 1 includes the colored region 7 for image recognition. The colored region 7 is colored with a color by which image recognition at a high recognition rate is possible, and is provided continuously in the circumferential direction. As such, even if the vehicle itself 100 on which the tire 1 is mounted is traveling, the colored region 7 of the rotating tire 1 will be recognized by the camera 201 of the following vehicle 200 at a high recognition rate.

As described above, according to the present embodiment, the colored region 7 for image recognition is provided on the tire 1. As such, declines in the recognition rate of the tire 1, which is mounted on the vehicle itself 100, by the camera 201 of the following vehicle 200 are suppressed. As a result, estimation of the distance between the vehicle itself 100 and the following vehicle 200 can be performed with high accuracy. Accordingly, colliding of the following vehicle 200 into the vehicle itself 100 is prevented.

In the present embodiment, the colored region 7 is provided in the circumferential direction. As such, even if the tire 1 mounted on the vehicle itself 100 is traveling (rolling), the camera 201 of the following vehicle 200 can recognize the colored region 7 at a high recognition rate.

Additionally, the tire 1 contacts the road surface. In other words, the distance between the road surface and the tire 1 is short. The tire 1 is disposed at a position near the road surface. Therefore, for example, even in a case where the camera 201 acquires an image IMb of the tire 1 projected on a road surface that is wet due to rain, errors in the estimation results of the distance between the vehicle itself 100 and the following vehicle 200, based on the image IMb of the tire 1 projected onto the road surface, are suppressed. As a result, declines in the recognition rate of the tire 1 mounted on the vehicle itself 100 are suppressed, and colliding of the following vehicle 200 into the vehicle itself 100 is prevented.

In the present embodiment, the reflectance of the colored region 7 with respect to visible light is greater than the reflectance of the ground colored region 13 with respect to visible light. As a result, the camera 201 can recognize the colored region 7 at a high recognition rate. For example, even when it rains at night, the camera 201 can recognize the colored region 7 at a high recognition rate.

In the present embodiment, the colored region 7 is provided on the surface of the shoulder portions 12. As a result, contact between the colored region 7 and the road surface is suppressed, and the colored region 7 can be made to last a long time. Additionally, in cases where the tire 1 is mounted on the vehicle itself 100, not only the camera 201 of the following vehicle 200 just behind, but also a camera 201 of a following vehicle 200 right behind and a camera 201 of a following vehicle 200 left behind can recognize the tire 1 of the vehicle itself 100 at a high recognition rate.

In the present embodiment, the dimension of the colored region 7 in the Y-axis direction is configured to be 10 mm or greater. As a result, the camera 201 of the following vehicle 200 can recognize the tire 1 of the vehicle itself 100 at a high recognition rate.

In the present embodiment, the colored region 7 includes the surface of the coating material applied to the foundation of the tire 1, namely the rubber. The foundation of the tire 1, namely the rubber, includes the tread rubber 6 and/or the sidewall rubber 8. As a result, the degree of freedom of selecting materials increases. As such, for example, a colored region 7 having a desired reflectance, a colored region 7 having a desired hue, a colored region 7 having a desired brightness, and a colored region 7 having a desired contrast with the ground colored region 13 can be easily provided.

In the present embodiment, the coating material may include a fluorescent coating material. As a result, even at night or when it rains, the camera 201 of the following vehicle 200 can recognize the tire 1 of the vehicle itself 100 at a high recognition rate.

In the present embodiment, the coating material may include a retroreflective coating material. As a result, the camera 201 of the following vehicle 200 can recognize the tire 1 of the vehicle itself 100 at a high recognition rate.

Second Embodiment

Next, a second embodiment will be described. In the description below, identical or substantially similar constituent portions to those of the above-described embodiments are assigned with the same reference numbers, and descriptions of those constituent portions are either simplified or omitted.

Figure 8:
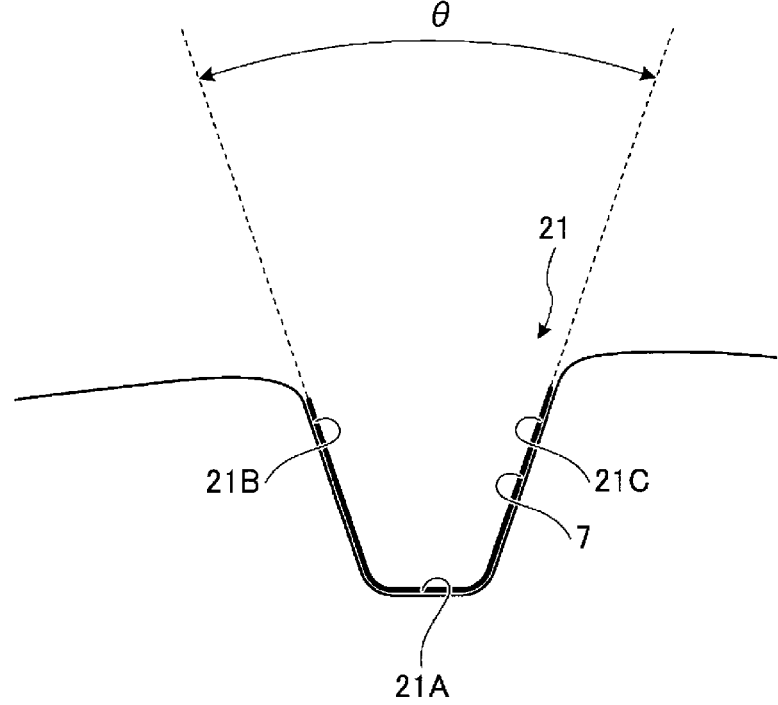
FIG. 8 is a drawing illustrating an example of a pneumatic tire according to a second embodiment.

FIG. 8 is a drawing illustrating an example of a tire 1 according to the present embodiment. As illustrated in FIG. 8, the colored region 7 may be provided on the inner surface of the main groove 21. Note that the colored region 7 may be provided on all of the plurality of main grooves 21 (four in this example), or may be provided on a portion (e.g. two) of the main grooves 21.

The inner surface of the main groove 21 includes a bottom surface 21A, a first wall surface 21B disposed on a first side of the bottom surface 21A in the Y-axis direction, and a second wall surface 21C disposed on a second side of the bottom surface 21A. In the present embodiment, an angle θ formed by the first wall surface 21B and the second wall surface 21C is not less than 30° and not greater than 120°.

As described above, according to the present embodiment, the colored region 7 includes the inner surface of the main groove 21 provided in the circumferential direction. As a result, the colored region 7 is provided in the circumferential direction. Additionally, contact between the colored region 7 and the road surface is suppressed. Accordingly, the colored region 7 will last a long time.

In the present embodiment, the angle θ formed by the first wall surface 21B and the second wall surface 21C is not less than 30° and not greater than 120°. As a result, not only the camera 201 of the following vehicle 200 just behind, but also a camera 201 of a following vehicle 200 right behind and a camera 201 of a following vehicle 200 left behind can recognize the tire 1 of the vehicle itself 100 at a high recognition rate.

Third Embodiment

Next, a third embodiment will be described. In the description below, identical or substantially similar constituent portions to those of the above-described embodiments are assigned with the same reference numbers, and descriptions of those constituent portions are either simplified or omitted.

Figure 9:
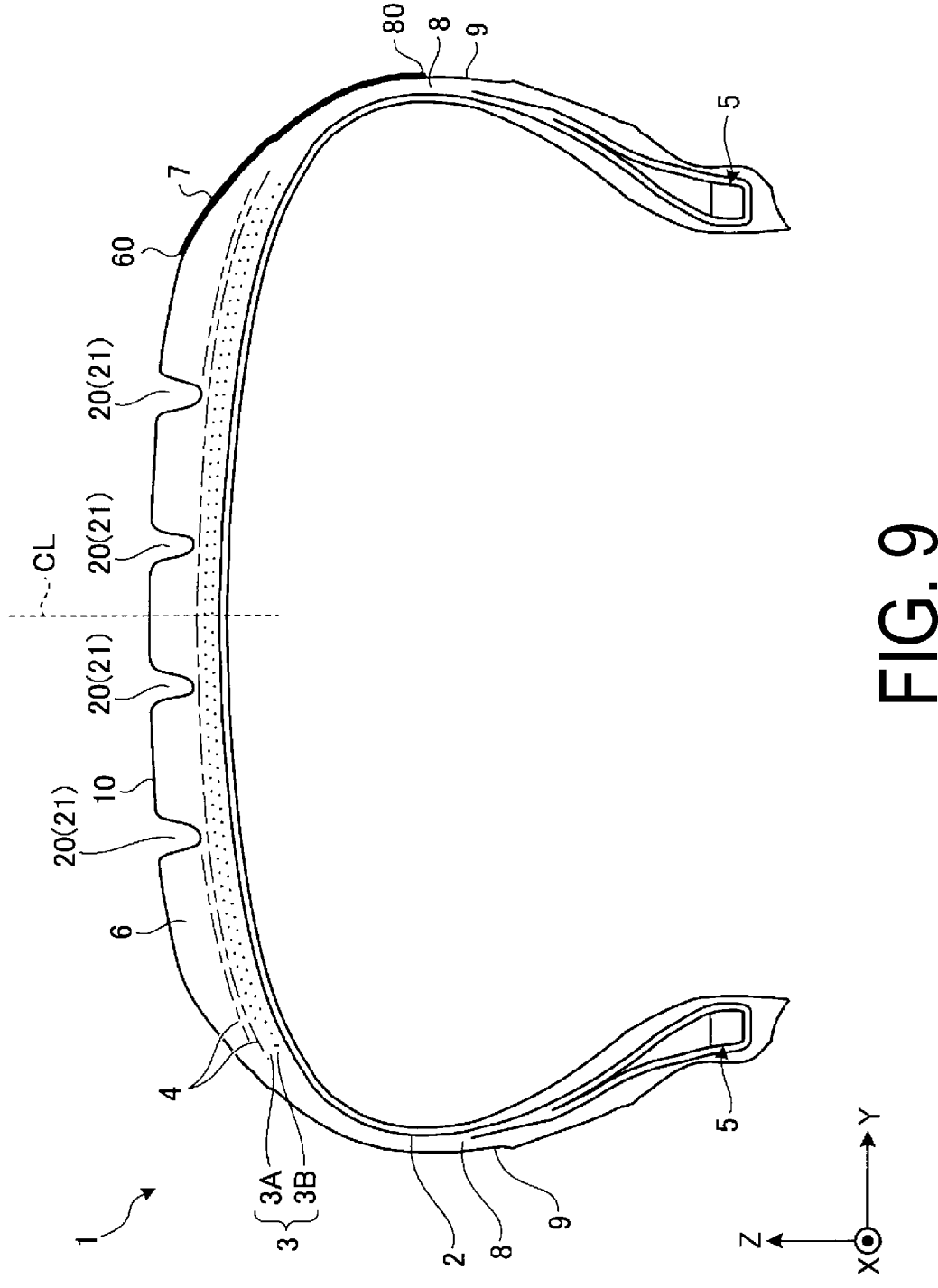
FIG. 9 is a drawing illustrating an example of a pneumatic tire according to a third embodiment.

FIG. 9 is a drawing illustrating an example of a tire 1 according to the present embodiment. As illustrated in FIG. 9, in the present embodiment, the colored region 7 is provided on the surface between the +Y side ground contact edge portion 60 of the ground contact region of the tread portion 10 and the farthest portion 80 to the +Y side of the sidewall portion 9 disposed on the +Y side of the tread portion 10.

The ground contact edge portion 60 is the edge portion of the tread ground contact width W. The portion 80 is the edge portion of the total tire width SW.

Note that in the example illustrated in FIG. 9, the colored region 7 is disposed on a first side (the +Y side) of the equatorial plane CL in the Y-axis direction. The colored region 7 may be disposed on a second side (the −Y side) of the equatorial plane CL in the Y-axis direction. Specifically, the colored region 7 may be provided on the surface between the −Y side ground contact edge portion 60 of the ground contact region of the tread portion 10 and the farthest portion 80 to the −Y side of the sidewall portion 9 disposed on the −Y side of the tread portion 10.

Additionally, the colored region 7 may be disposed on both sides of the equatorial plane CL in the Y-axis direction, may be disposed only on the first side of the equatorial plane CL, or may be disposed only on the second side of the equatorial plane CL.

As described above, according to the present embodiment, the colored region 7 is provided on the sidewall portion 9 in addition to being provided on the shoulder portion 12. As a result, the camera 201 of the following vehicle 200 can recognize the tire 1 of the vehicle itself 100 at a high recognition rate.

Fourth Embodiment

Next, a fourth embodiment will be described. In the description below, identical or substantially similar constituent portions to those of the above-described embodiments are assigned with the same reference numbers, and descriptions of those constituent portions are either simplified or omitted.

Figure 10:
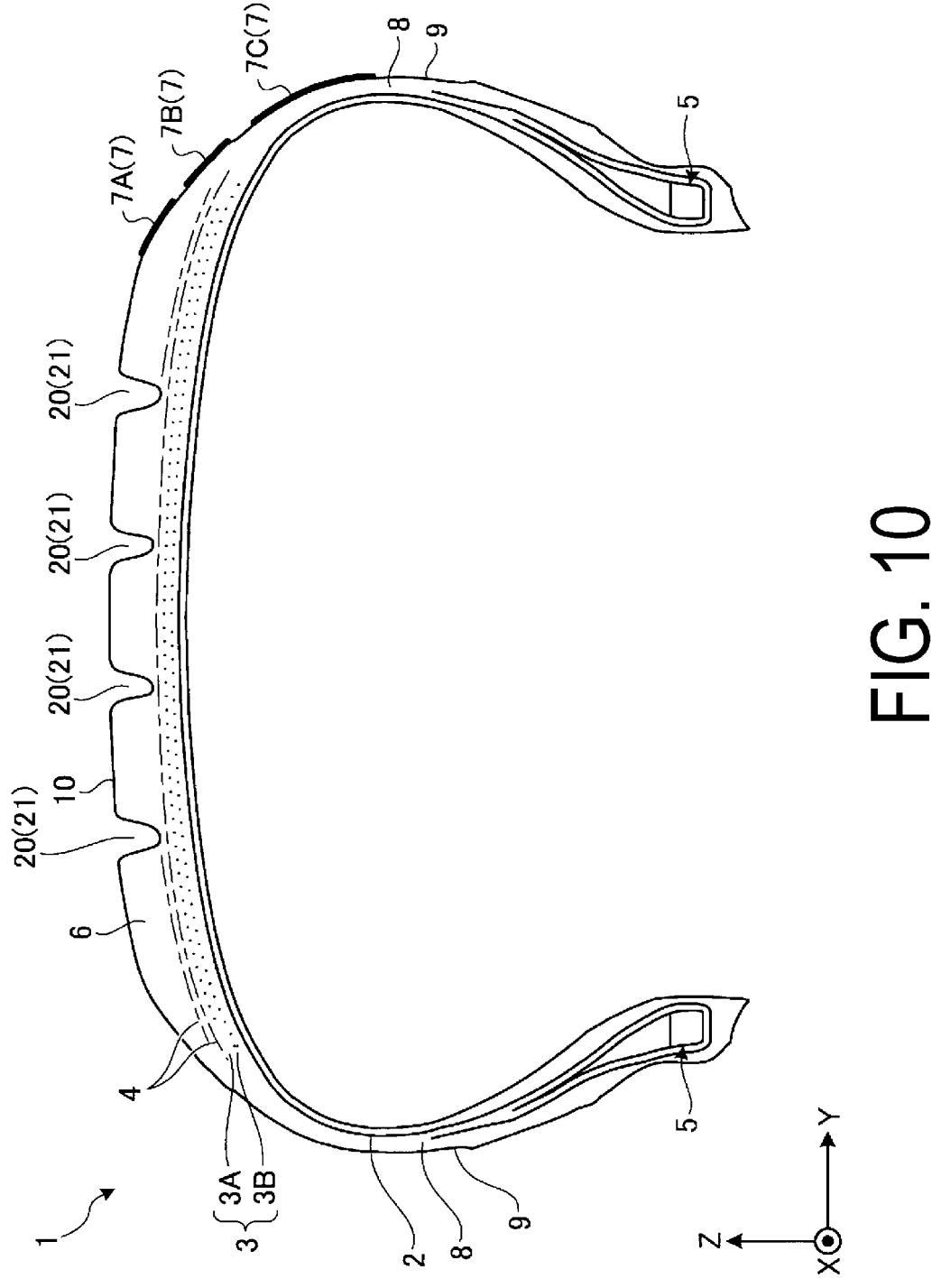
FIG. 10 is a drawing illustrating an example of a pneumatic tire according to a fourth embodiment.

FIG. 10 is a drawing illustrating an example of a tire 1 according to the present embodiment. FIG. 10 is a modified example of the third embodiment described while referencing FIG. 9.

As illustrated in FIG. 10, a plurality of colored regions 7 are provided, at a spacing in the Y-axis direction, on the surface of the tire 1 on the first side (+Y side) of the equatorial plane CL that passes through the center of the tread portion 10 in the Y-axis direction. In the example illustrated in FIG. 9, the colored region 7 includes a colored region 7A, a colored region 7B disposed at a spacing next to the +Y side of the colored region 7A, and a colored region 7C disposed at a spacing next to the +Y side of the colored region 7B.

In the example illustrated in FIG. 10, dimensions (widths) of the colored regions 7 (7A, 7B, and 7C) in the Y-axis direction are greater than the dimension of the spacing between the colored region 7A and the colored region 7B and the dimension of the spacing between the colored region 7B and the colored region 7C.

According to the present embodiment, even if at least a portion of the colored regions 7 is damaged, that damage is prevented from spreading. The tire 1 repeatedly deforms due to, for example, driving, braking, and turning. Additionally, the tire 1 may come in contact with a barrier such as a curb. As a result of repeated deformation or contact with barriers, a portion of the colored region 7 may become damaged. Because a plurality of the colored regions 7 are provided at a spacing, even if a portion of the colored regions 7 (e.g. the colored region 7C) becomes damaged, cracks, or peels, spreading of this cracking or peeling to the other colored regions 7 (the colored region 7A and the colored region 7B) is suppressed. As a result, even if a portion of the colored regions 7 (e.g. the colored region 7C) of the plurality of colored regions 7 becomes damaged, the other colored regions 7 (the colored region 7A and the colored region 7B) can be maintained in a normal state. Accordingly, the camera 201 of the following vehicle 200 can recognize the tire 1 of the vehicle itself 100.

In the present embodiment, the widths of the colored regions 7 are greater than the widths of the spacings. As a result, in terms of per unit area of the surface of the tire 1, the proportion occupied by the colored regions 7 is greater than the proportion occupied by the spacings. As such, the camera 201 of the following vehicle 200 can recognize the tire 1 of the vehicle itself 100 at a high recognition rate.

Fifth Embodiment

Next, a fifth embodiment will be described. In the description below, identical or substantially similar constituent portions to those of the above-described embodiments are assigned with the same reference numbers, and descriptions of those constituent portions are either simplified or omitted.

In the present embodiment, a plurality of the colored regions 7 are provided intermittently in the circumferential direction of the center axis AX (the tire 1). In the description below, a belt region including the plurality of colored regions 7 provided intermittently in the circumferential direction of the center axis AX is referred to as the "first belt region 31" for convenience.

The first belt region 31 is a speed measurement belt region including the plurality of colored regions 7 provided intermittently in the circumferential direction of the center axis AX.

In the present embodiment, the first belt region 31 is provided on the surface of the shoulder portion 12. The first belt region 31 including the colored regions 7 is provided in the shoulder region AR. The colored regions 7 are provided intermittently in the circumferential direction in the shoulder region AR.

Figure 11:
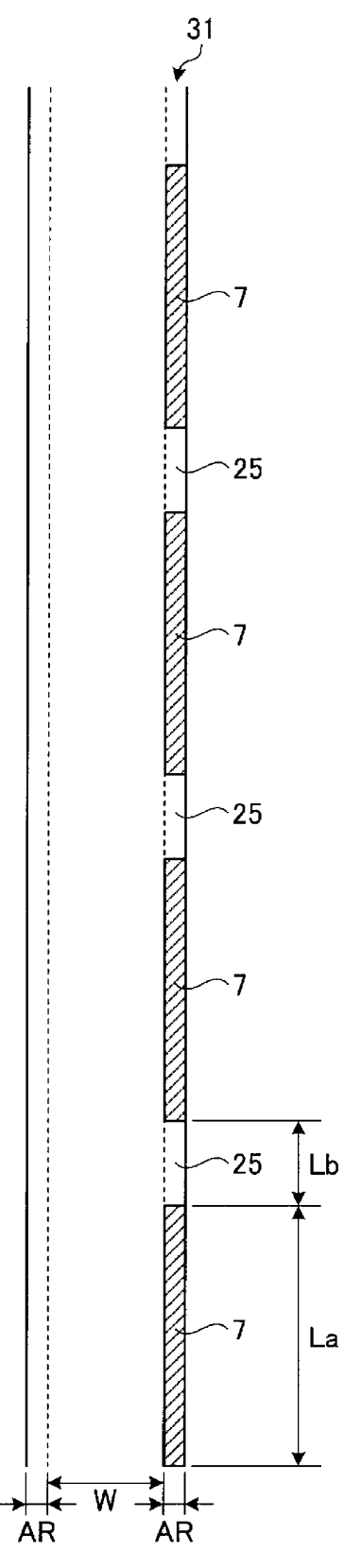
FIG. 11 is a development view illustrating an example of a first belt region according to a fifth embodiment.

FIG. 11 is a developed view in which the tread portion 10 is developed in the circumferential direction. FIG. 11 illustrates an example in which the colored regions 7 (the first belt region 31) are provided in one shoulder region AR of the two shoulder regions AR.

In the example illustrated in FIG. 11, four of the colored regions 7 are provided intermittently in the circumferential direction. Dimensions La in the circumferential direction of the plurality of colored regions 7 are equivalent. A blank region 25 is provided between adjacent colored regions 7. The blank region 25 includes the ground colored region 13. A plurality of the blank regions 25 are provided intermittently in the circumferential direction. Dimensions Lb in the circumferential direction of the plurality of blank regions 25 are equivalent.

Figure 12:
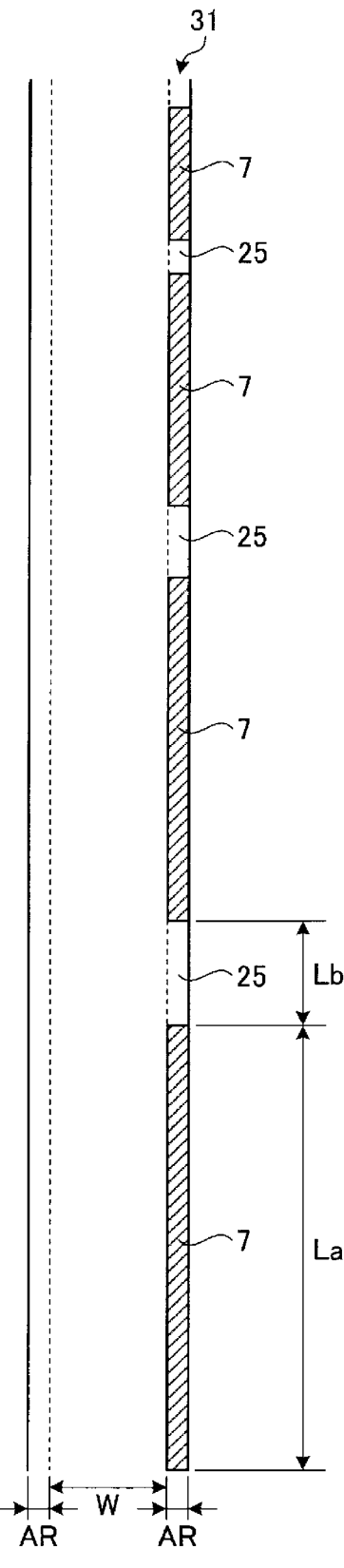
FIG. 12 is a development view illustrating an example of the first belt region according to the fifth embodiment.

FIG. 12 is a developed view in which the tread portion 10 is developed in the circumferential direction. FIG. 12 illustrates an example in which the colored regions 7 (the first belt region 31) are provided in one shoulder region AR of the two shoulder regions AR.

FIG. 12 illustrates another example of the first belt region 31. In the example illustrated in FIG. 12, four of the colored regions 7 are provided intermittently in the circumferential direction. The dimensions La in the circumferential direction of the plurality of colored regions 7 differ from each other. A blank region 25 is provided between adjacent colored regions 7. Here, the dimensions Lb in the circumferential direction of the plurality of blank regions 25 differ from each other.

Figure 13:
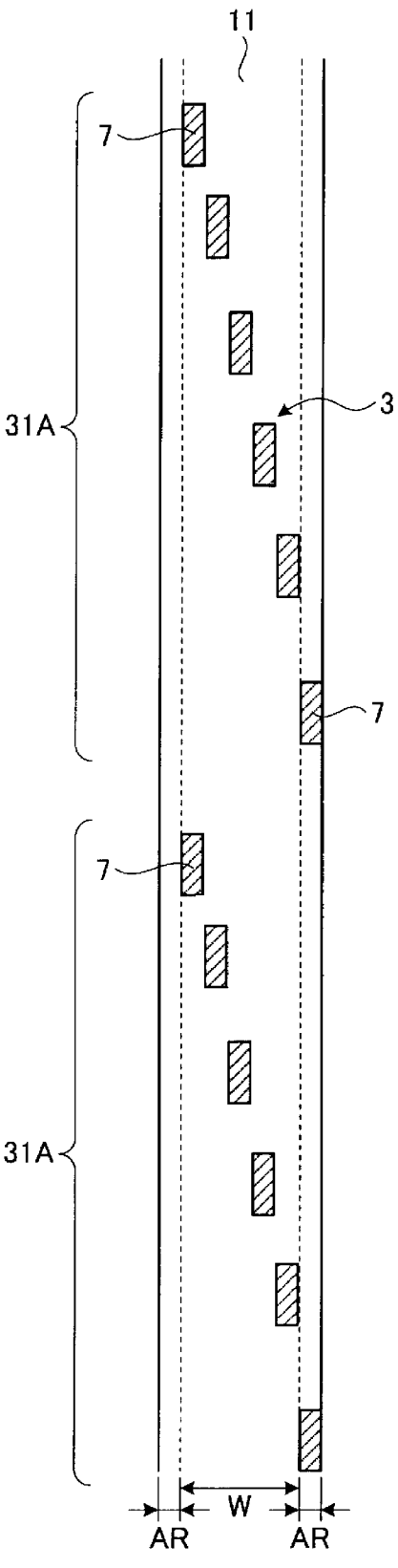
FIG. 13 is a development view illustrating an example of the first belt region according to the fifth embodiment.
Figure 14:
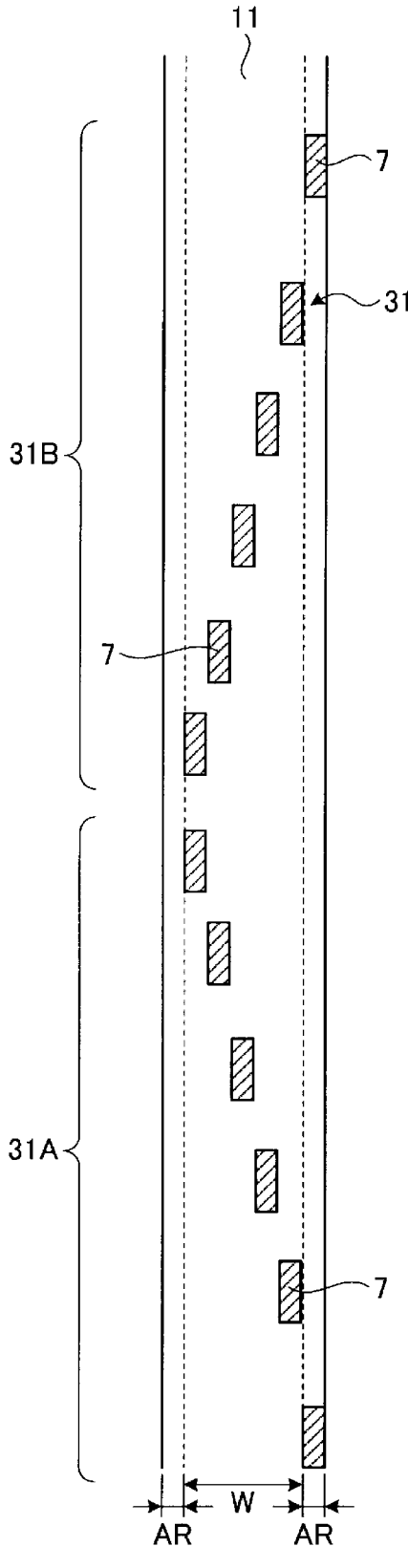
FIG. 14 is a development view illustrating an example of the first belt region according to the fifth embodiment.

FIGS. 13 and 14 illustrate other examples of the first belt region 31. In the examples illustrated in FIGS. 13 and 14, the colored regions 7 of the first belt region 31 are not only provided in the shoulder portion 12, but also in the center portion 11. The plurality of colored regions 7 are disposed in both the circumferential direction and the width direction of the tire 1. In the example illustrated in FIG. 13, the first belt region 31 includes two groups 31A in which positions of the colored regions 7 in the width direction of the tire 1 gradually change from a first side to a second side in the width direction. In the example illustrated in FIG. 14, the first belt region 31 includes a group 31A in which positions of the colored regions 7 in the width direction of the tire 1 gradually change from the first side to the second side in the width direction, and a group 31B in which the positions of the colored regions 7 in the width direction gradually change from the second side to the first side.

In the present embodiment, a dimension of the colored regions 7 of the first belt region 31 in the Y-axis direction is 5 mm or greater. The dimension of the colored regions 7 of the first belt region 31 in the Y-axis direction may be 7 mm or greater.

Figure 15:
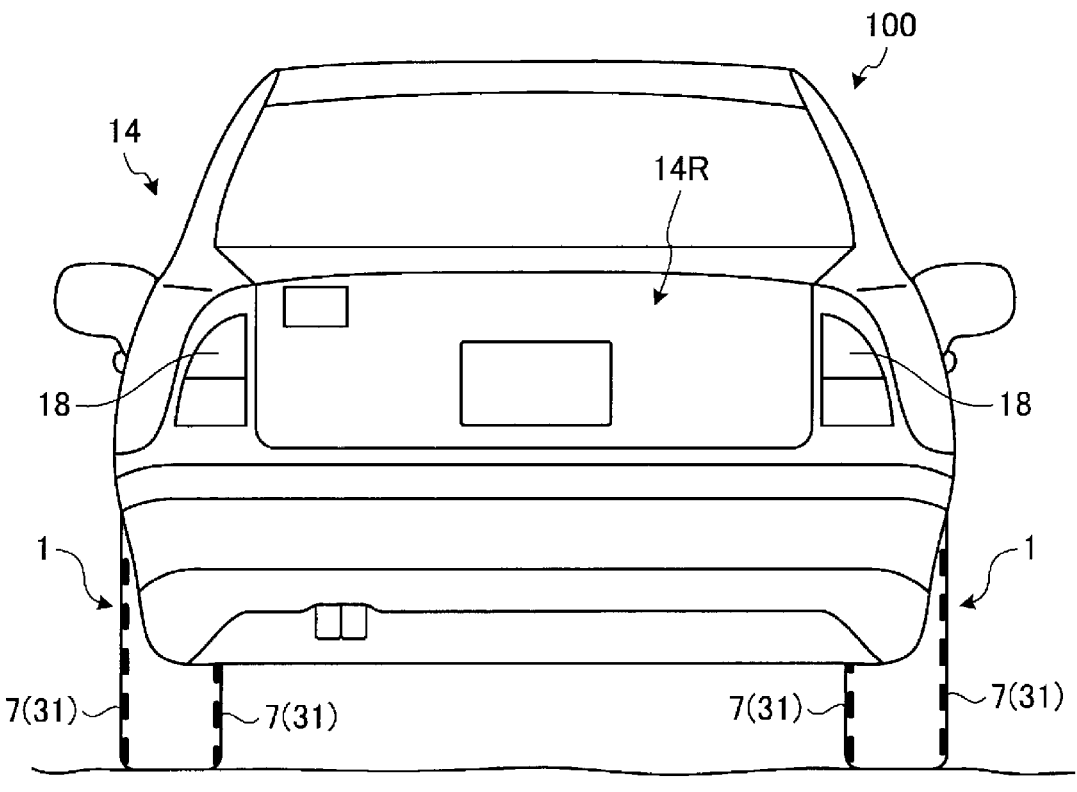
FIG. 15 is a drawing illustrating an example of a vehicle on which the pneumatic tire according to the fifth embodiment is mounted.

FIG. 15 is a drawing illustrating an example of a vehicle 100 on which the tire 1 that includes the first belt region 31 is mounted. FIG. 15 is a drawing of the vehicle 100, as viewed from behind the vehicle 100. As illustrated in FIG. 15, the tire 1 is mounted on at least the rearmost wheel (the rear wheels in this example).

As in the embodiment described above, the tire 1 is mounted on the vehicle itself 100. The following vehicle 200 is provided with a collision aversion system for avoiding collisions (rear end collisions) with the vehicle itself 100. A camera 201 for acquiring images of the vehicle itself 100 is mounted on the following vehicle 200. The camera 201 acquires images of the vehicle itself 100. The collision avoidance system of the following vehicle 200 estimates the travel speed of the vehicle itself 100 from the images of the vehicle itself 100 acquired by the camera 201.

In the present embodiment, the first belt region 31 is provided on the tire 1 mounted on the vehicle itself 100. The first belt region 31 includes the plurality of colored regions 7 provided intermittently in the circumferential direction (the rotation direction of the tire 1). The camera of the following vehicle acquires images of the tire 1 of the vehicle itself 100 at a predetermined frame rate (at a predetermined cycle). In cases where the camera acquires images of a tire 1 that is traveling (rolling), the images of the first belt region 31 acquired at each frame rate will be different. Specifically, in cases where the camera acquires images of the tire 1 that is traveling (rolling), positions of the colored regions 7 of the first belt region 31 in the viewing area of the camera (or positions and areas of the colored regions occupying the viewing area of the camera) acquired at a first frame rate are different than positions of the colored regions 7 of the first belt region 31 in the viewing area of the camera (or positions and areas of the colored regions occupying the viewing area of the camera) acquired at a second frame rate, subsequent to the first frame rate.

As such, the rotation speed of the tire 1 mounted on the vehicle itself 100 is estimated on the basis of the frame rate (cycle) at which the images are acquired and the images of the first belt region 31 acquired at each frame rate. The travel speed of the vehicle itself 100 can be estimated by the estimated rotation speed of the tire 1. As such, in the present embodiment, the first belt region 31 of the tire 1 mounted on the vehicle itself 100 functions as a belt region for speed measurement (speed estimation) for measuring (estimating) the rotation speed of the tire 1 and the travel speed of the vehicle itself 100 using the camera (monocular camera) of the following vehicle 200.

As described above, according to the present embodiment, the first belt region 31 for speed measurement, which includes the plurality of colored regions 7 provided intermittently, is provided on the tire 1. The camera of the following vehicle acquires images of the tire 1 at the predetermined frame rate. As such, the rotation speed of the tire 1 mounted on the vehicle itself 100 is estimated on the basis of that frame rate and the images of the first belt region 31 acquired at each frame rate. The travel speed of the vehicle itself 100 can be estimated by the estimated rotation speed of the tire 1. As a result, colliding of the following vehicle into the vehicle itself 100 is prevented.

According to the present embodiment, the reflectance of the colored regions 7 with respect to visible light is greater than the reflectance of the ground colored region 13. As a result, the colored regions 7 will be recognized by the camera at a high recognition rate. For example, even when raining at night, the colored regions 7 will be recognized by the camera at a high recognition rate.

According to the present embodiment, the first belt region 31 is provided on the surface of the shoulder portion 12 of the tire 1. As a result, contact between the colored regions 7 of the first belt region 31 and the road surface is suppressed. As such, the colored regions 7 will last a long time. Additionally, in cases where the tire 1 is mounted on the vehicle itself 100, not only the camera of a following vehicle just behind, but also a camera of a following vehicle right behind and a camera of a following vehicle left behind will recognize the pneumatic tire of the vehicle itself at a high recognition rate.

As illustrated in FIG. 12, the dimensions La in the circumferential direction of the plurality of colored regions 7 may differ from each other. Because the plurality of colored regions 7 are disposed with unequal lengths and at unequal spacings, the camera of the following vehicle can estimate the rotation speed of the tire 1 with high accuracy on the basis of the images of the first belt region 31, even if the tire 1 is rotating at a high speed.

As illustrated in FIGS. 13 and 14, the plurality of colored regions 7 are disposed such that the positions of the colored regions 7 not only in the circumferential direction but also in the width direction differ. As such, differences between the images at the first frame rate and images at the second frame rate are more prone to occur, even if the tire 1 is rotating at a high speed. As such, the camera of the following vehicle can estimate the rotation speed of the tire 1 with high accuracy on the basis of the images of the first belt region 31, even if the tire 1 is rotating at a high speed. Particularly, as illustrated in FIG. 14, in cases where the tire 1 includes the group 31A and the group 31B, rotation at higher speeds of the tire 1 can be handled.

In the present embodiment, the dimension of the colored regions of the first belt region in the direction parallel to the center axis is 5 mm or greater. As a result, the pneumatic tire of the vehicle itself will be recognized by the camera of the following vehicle at a high recognition rate.

Note that, in the present embodiment, the colored regions 7 of the first belt region 31 are provided on the shoulder portion 12. However, for example, the colored regions 7 of the first belt region 31 may be provided on the inner surface of the main grooves 21. Even with this configuration, contact of the colored regions 7 of the first belt region 31 with the road surface can be suppressed, and the colored regions 7 can be made to last a long time.

Sixth Embodiment

Next, a sixth embodiment will be described. In the description below, identical or substantially similar constituent portions to those of the above-described embodiments are assigned with the same reference numbers, and descriptions of those constituent portions are either simplified or omitted.

Figure 16:
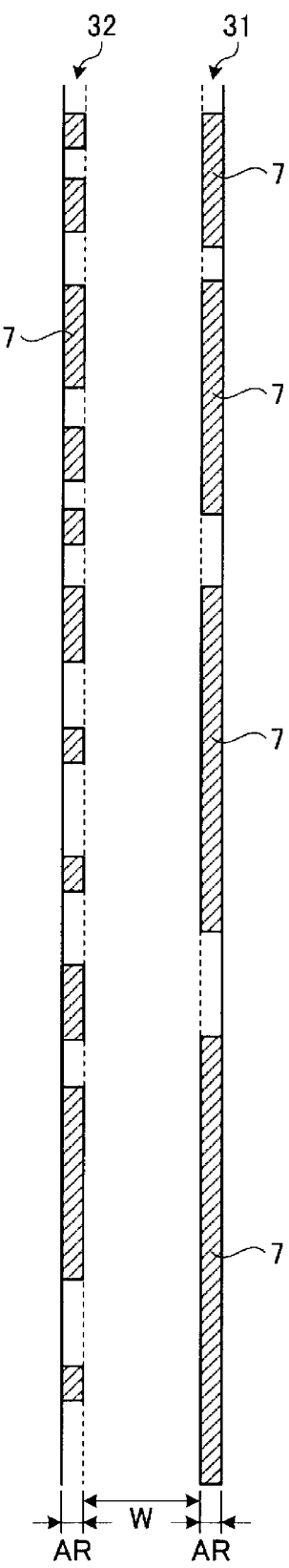
FIG. 16 is a development view illustrating an example of a pneumatic tire according to a sixth embodiment.

FIG. 16 is a drawing illustrating an example of a tire 1 according to the present embodiment. FIG. 16 is a developed view of the tread portion 10 of the tire 1. In the present embodiment, the surface of the tire 1 further includes a second belt region 32 for unique information identification, which includes a plurality of the colored regions 7 provided intermittently in the circumferential direction of the center axis AX.

In the example illustrated in FIG. 16, the second belt region 32 is provided on the shoulder portion 12 (in the shoulder region AR). Note that the second belt region 32 may be provided on the center portion 11.

An identification pattern is formed by the plurality of colored regions 7 of the second belt region 32. The second belt region 32 provided on the tire 1 includes unique information of the tire 1. The second belt region 32 that includes the plurality of colored regions 7 functions as a bar code.

The camera 201 of the following vehicle 200 acquires the unique information of the tire 1 by acquiring images of the second belt region 32. The camera 201 of the following vehicle 200 functions as a bar code reader.

The unique information of the tire 1 includes at least one of the outer diameter of the tire 1, the circumferential length of the tire 1, or the type of tire 1. Examples of types of tire 1 include the classifications of studless tires, all-season tires, winter tires, and summer tires. Note that the second belt region 32 may include unique information of the vehicle 100 such as the overall length, and, the overall width of the vehicle 100.

The camera 201 of the following vehicle 200 acquires images of the first belt region 31 and images of the second belt region 32. The rotation speed of the tire 1 is estimated on the basis of the images of the first belt region 31. Information pertaining to the outer diameter or circumferential length of the tire 1 is acquired on the basis of the images of the second belt region 32. Thus, the travel speed of the vehicle 100 can be accurately estimated on the basis of the rotation speed of the tire 1 and the outer diameter or circumferential length of the tire 1.

As described above, according to the present embodiment, the camera 201 of the following vehicle 200 acquires images of the second belt region 32 that functions as a bar code. As such, the unique information of the tire 1 mounted on the vehicle itself 100 is recognized by the following vehicle.

Seventh Embodiment

Next, a seventh embodiment will be described. In the description below, identical or substantially similar constituent portions to those of the above-described embodiments are assigned with the same reference numbers, and descriptions of those constituent portions are either simplified or omitted.

Figure 17:
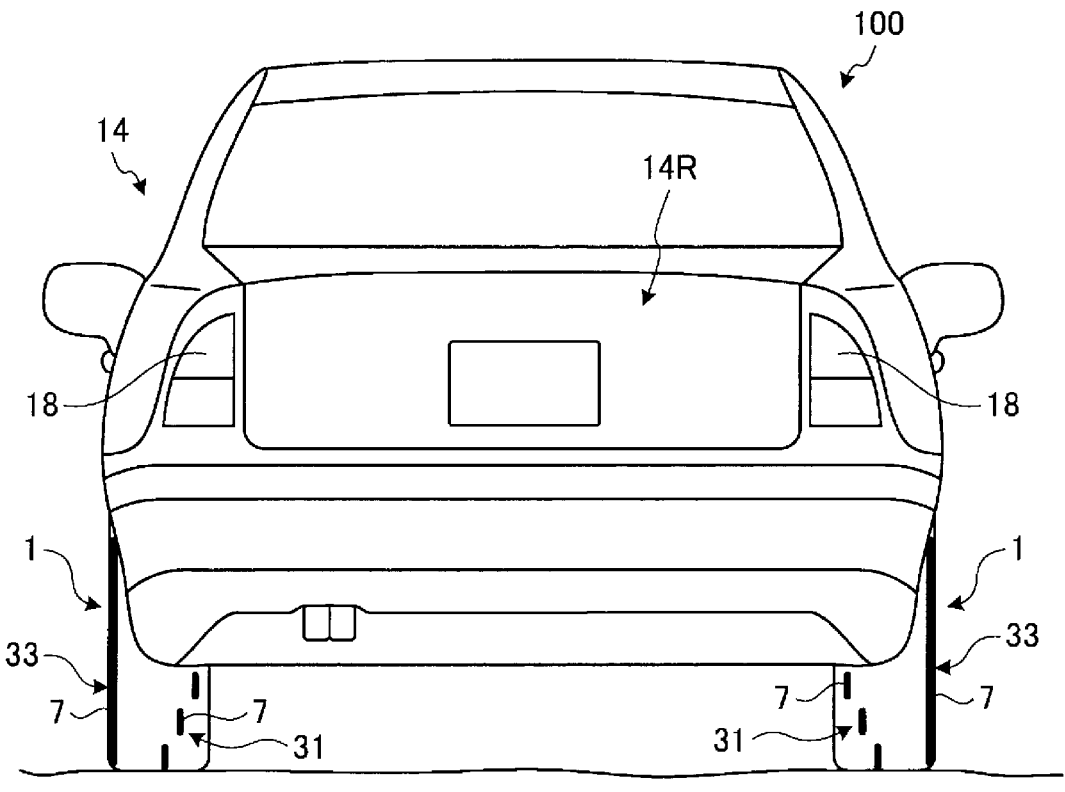
FIG. 17 is a drawing illustrating an example of a vehicle on which a pneumatic tire according to a seventh embodiment is mounted.

FIG. 17 is a drawing of the vehicle 100 on which the tire 1 according to the present embodiment is mounted, viewed from behind the vehicle 100. In the present embodiment, the surface of the tire 1 further includes a third belt region 33 for image recognition, which includes a colored region 7 provided in the circumferential direction of the center axis AX.

The colored region 7 of the third belt region 33 is a region for image recognition. Images of the tire 1 are acquired by the camera 201. The color of the colored region 7 is a color whereby the camera 201 can perform image recognition at a high recognition rate.

The colored region 7 of the third belt region 33 is provided in the circumferential direction. The colored region 7 of the third belt region 33 does not break and is provided continuously in the circumferential direction. Note that the colored region 7 of the third belt region 33 may be disposed on a portion of the periphery of the center axis AX.

In the present embodiment, the third belt region 33 is provided on the surface of the shoulder portion 12. Note that in the example illustrated in FIG. 17, at least a portion of the first belt region 31 is provided on the center portion 11.

As described above, according to the present embodiment, the third belt region 33 for image recognition is provided on the tire 1. As such, declines in the recognition rate of the tire 1, which is mounted on the vehicle itself 100, by the camera 201 of the following vehicle 200 are suppressed. As a result, estimation of the distance between the vehicle itself 100 and the following vehicle 200 can be performed with high accuracy. Accordingly, colliding of the following vehicle 200 into the vehicle itself 100 is prevented.

In the present embodiment, the colored region 7 of the third belt region 33 is provided in the circumferential direction. As such, even if the tire 1 mounted on the vehicle itself 100 is traveling (rolling), the camera 201 of the following vehicle 200 can recognize the colored region 7 at a high recognition rate.

Additionally, the tire 1 contacts the road surface. In other words, the distance between the road surface and the tire 1 is short. The tire 1 is disposed at a position near the road surface. Therefore, for example, even in a case where the camera 201 acquires an image IMb of the tire 1 projected on a road surface that is wet due to rain, errors in the estimation results of the distance between the vehicle itself 100 and the following vehicle 200, based on the image of the tire 1 projected onto the road surface, are suppressed. As a result, declines in the recognition rate of the tire 1 mounted on the vehicle itself 100 are suppressed, and colliding of the following vehicle 200 into the vehicle itself 100 is prevented.

In the present embodiment, the reflectance of the colored region 7 with respect to visible light is greater than the reflectance of the ground colored region 13 with respect to visible light. As a result, the camera 201 can recognize the colored region 7 at a high recognition rate. For example, even when it rains at night, the camera 201 can recognize the colored region 7 at a high recognition rate.

In the present embodiment, the colored region 7 of the third belt region 33 is provided on the surface of the shoulder portion 12. As a result, contact between the colored region 7 of the third belt region 33 and the road surface is suppressed, and the colored region 7 can be made to last a long time. Additionally, in cases where the tire 1 is mounted on the vehicle itself 100, not only the camera 201 of the following vehicle 200 just behind, but also a camera 201 of a following vehicle 200 right behind and a camera 201 of a following vehicle 200 left behind can recognize the tire 1 of the vehicle itself 100 at a high recognition rate.

Eighth Embodiment

Next, an eighth embodiment will be described. In the description below, identical or substantially similar constituent portions to those of the above-described embodiments are assigned with the same reference numbers, and descriptions of those constituent portions are either simplified or omitted.

Figure 18:
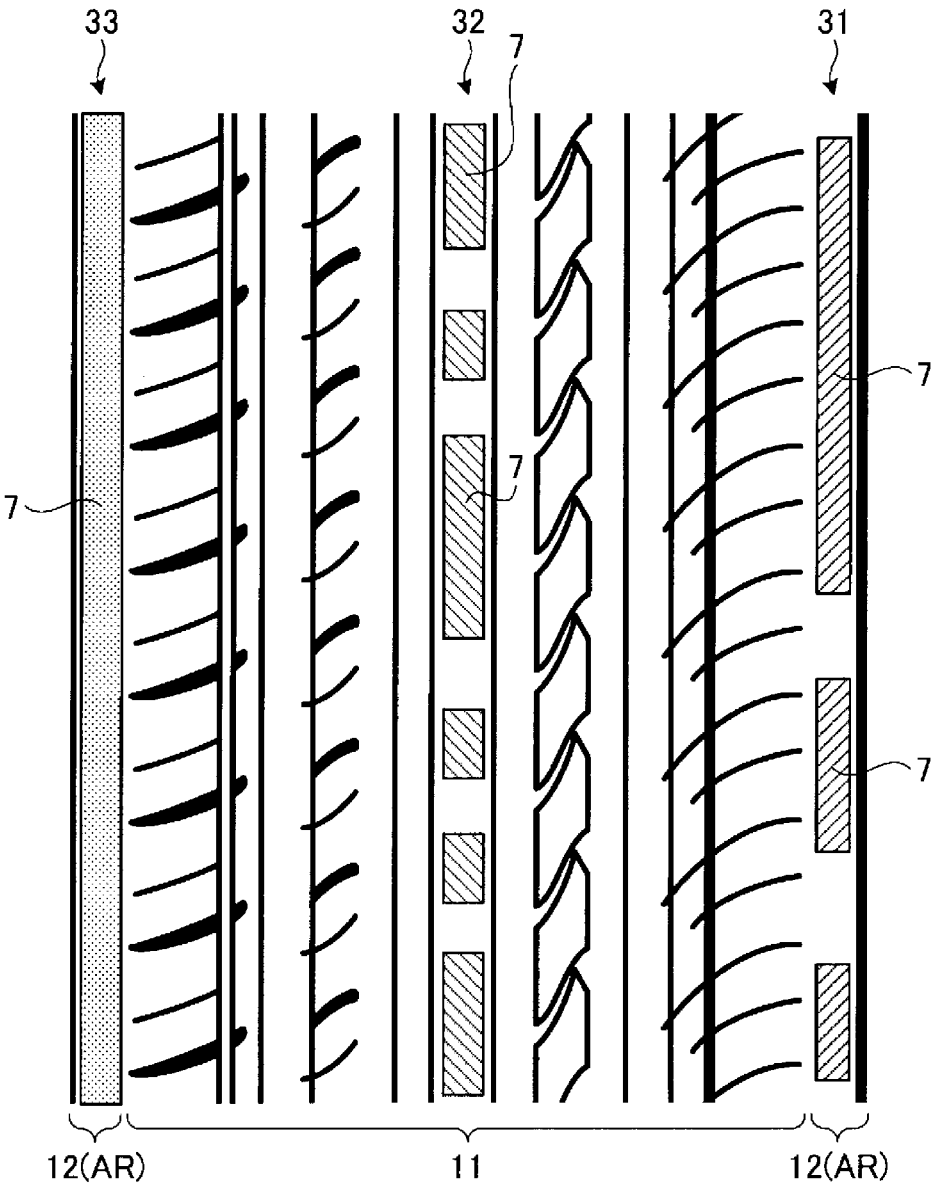
FIG. 18 is a drawing illustrating an example of a tread portion of a pneumatic tire according to an eighth embodiment.

FIG. 18 is a drawing illustrating an example of a tire 1 according to the present embodiment. FIG. 18 is a developed view of the tread portion 10 of the tire 1. As illustrated in FIG. 18, in the present embodiment, the surface of the tire 1 includes a first belt region 31 for speed measurement, a second belt region 32 for unique information identification, and a third belt region 33 for image recognition. The first belt region 31 includes a plurality of colored regions 7 provided intermittently in the circumferential direction of the center axis AX. The second belt region 32 includes a plurality of colored regions 7 provided intermittently in the circumferential direction of the center axis AX. The third belt region 33 includes a colored region 7 provided in the circumferential direction of the center axis AX.

In the example illustrated in FIG. 18, in a state where the tire 1 is mounted on the vehicle, the first belt region 31 is disposed on the inner side of the vehicle. The third belt region 33 is disposed on the outer side of the vehicle. The second belt region 32 is disposed between the first belt region 31 and the third belt region 33 in the width direction.

The first belt region 31 is provided on one of the shoulder portions 12 (in the shoulder region AR). The second belt region 32 is provided on the center portion 11. The third belt region 33 is provided on the other shoulder portion 12 (in the shoulder region AR).

In the present embodiment, the surface of the tire 1, where the first belt region 31 is disposed, of the shoulder portion 12 is the flat surface. The grooves 20 (the lug grooves 22) are not provided on the surface of the tire 1 where the first belt region 31 is disposed.

In the present embodiment, the surface of the tire 1, where the third belt region 33 is disposed, of the shoulder portion 12, is the flat surface. The grooves 20 (the lug grooves 22) are not provided on the surface of the tire 1 where the third belt region 33 is disposed.

In the present embodiment, the surface of the tire 1, where the second belt region 32 is disposed, of the center portion 11, is the flat surface. The grooves 20 (the lug grooves 22) are not provided on the surface of the tire 1 where the second belt region 32 is disposed.

The surface of the tire 1 where the colored regions 7 are provided is flat and, as such, the colored regions 7 are smoothly formed.

The unique information of the tire 1 possessed by the second belt region 32 may include circumferential length data of the tire 1. The following vehicle acquires circumferential length data of the tire 1 from the second belt region 32 and rotation speed data of the tire 1 from the first belt region 31. As such, the travel speed of the leading vehicle itself can be more accurately calculated on the basis of the circumferential length data and the rotation speed data.

The unique information of the tire 1 possessed by the second belt region 32 may include width data indicating the width dimension of the tire 1. The following vehicle acquires the width data of the tire 1 from the second belt region 32 and corrects the size of the tire 1, acquired from the images, on the basis of the width data. As such, correct dimension data of the tire 1 can be acquired from the image data.

The unique information of the tire 1 possessed by the second belt region 32 may include overall width data indicating the overall width dimension of the vehicle (the vehicle itself) on which the tire 1 is mounted. The following vehicle acquires the overall width data of the vehicle from the second belt region 32 and corrects the size of the vehicle and the size of the tire 1, acquired from the images, on the basis of the overall width data. As such, correct dimension data of the vehicle and correct dimension data of the tire 1 can be acquired from the image data.

Ninth Embodiment

Next, a ninth embodiment will be described. In the description below, identical or substantially similar constituent portions to those of the above-described embodiments are assigned with the same reference numbers, and descriptions of those constituent portions are either simplified or omitted.

Figure 19:
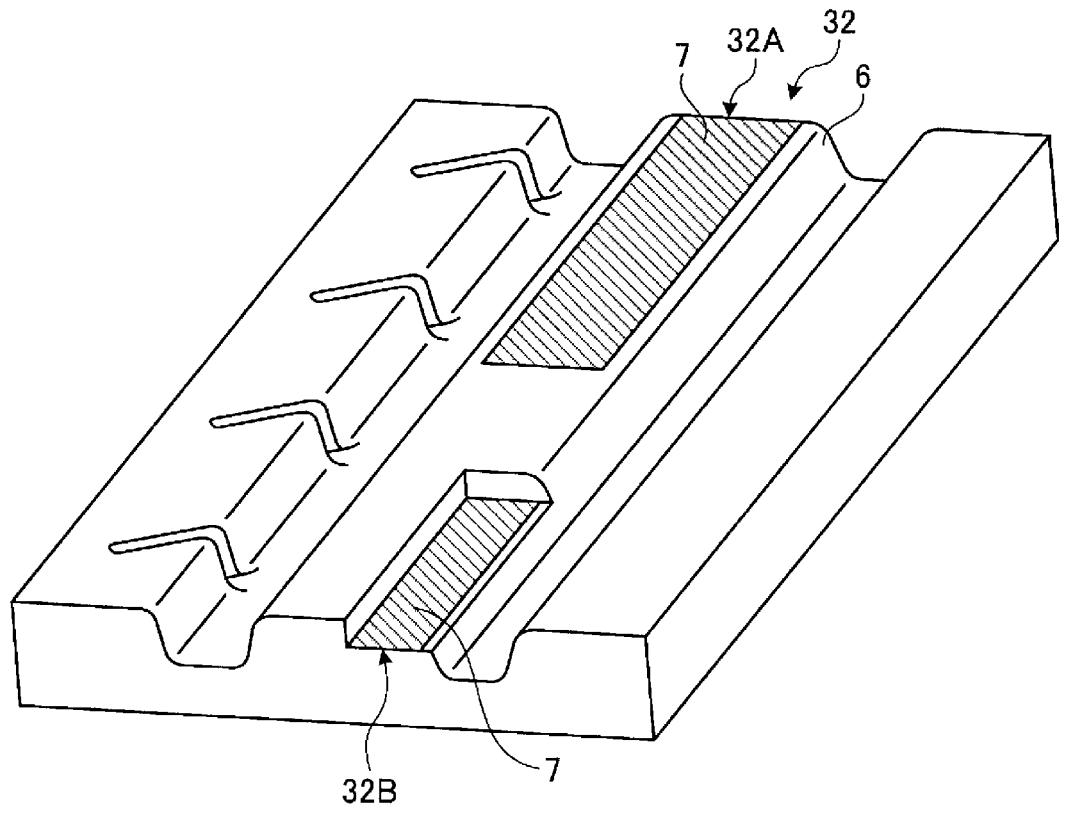
FIG. 19 is a drawing illustrating an example of a tread portion of a pneumatic tire according to a ninth embodiment.

FIG. 19 is a drawing schematically illustrating an example of the second belt region 32 according to the present embodiment. As illustrated in FIG. 19, the second belt region 32 includes a first unique information identification second belt region 32A and a second unique information identification second belt region 32B. The first unique information identification second belt region 32 A includes a plurality of colored regions 7 provided intermittently in the circumferential direction of the center axis AX. The second unique information identification second belt region 32B provided inward of the second belt region 32A in a radiation direction with respect to the center axis AX includes a plurality of colored regions 7 provided intermittently in the circumferential direction of the center axis AX. The second belt region 32A is disposed outward of the second belt region 32B in the radial direction.

The second belt region 32A is provided on the surface of the tread portion 10. The second belt region 32B is embedded in the tread rubber 6 of the tread portion 10. The second belt region 32A includes a first unique information. The second belt region 32B includes a second unique information that differs from the first unique information.

During the initial period of wear of the tread rubber 6, the colored regions 7 of the second belt region 32A are disposed on the surface of the tire 1. The camera 201 of the following vehicle 200 acquires images of the second belt region 32A. The camera 201 of the following vehicle 200 acquires the first unique information of the tire 1 by acquiring images of the second belt region 32A. During the initial period of wear of the tread rubber 6, the second belt region 32B is embedded in the tread rubber 6. Accordingly, during the initial period of wear of the tread rubber 6, the camera 201 of the following vehicle 200 acquires images of the second belt region 32A, and does not acquire images of the second belt region 32B. In the initial period of wear of the tread rubber 6, the camera 201 of the following vehicle 200 acquires the first unique information of the tire 1, and does not acquire the second unique information of the tire 1.

The tread rubber 6 wears due to the traveling of the tire 1. During the intermediate period of wear and the terminal stage of wear of the tread rubber 6, the second belt region 32A disappears, and the colored regions 7 of the second belt region 32B become disposed on the surface of the tire 1. The camera 201 of the following vehicle 200 acquires images of the second belt region 32B. The camera 201 of the following vehicle 200 acquires the second unique information of the tire 1 by acquiring images of the second belt region 32B. During the intermediate period of wear and the terminal stage of wear of the tread rubber 6, the second belt region 32B has disappeared. Accordingly, during the intermediate period of wear and the terminal stage of wear of the tread rubber 6, the camera 201 of the following vehicle 200 acquires images of the second belt region 32B, and does not acquire images of the second belt region 32A. In the intermediate period of wear and the terminal stage of wear of the tread rubber 6, the camera 201 of the following vehicle 200 acquires the second unique information of the tire 1, and does not acquire the first unique information of the tire 1.

Note that the unique information of the tire 1 possessed by the second belt region 32B may include wear data indicating an amount of wear of the tread rubber 6.

As described above, according to the present embodiment, the unique information of the tire 1 acquired by the camera 201 of the following vehicle 200 can be caused to change on the basis of the amount of wear of the tread rubber 6. As a result, the following vehicle 200 can understand the wear state of the tread portion 10 of the tire 1.

Tenth Embodiment

Next, a tenth embodiment will be described. In the description below, identical or substantially similar constituent portions to those of the above-described embodiments are assigned with the same reference numbers, and descriptions of those constituent portions are either simplified or omitted.

Figure 20:
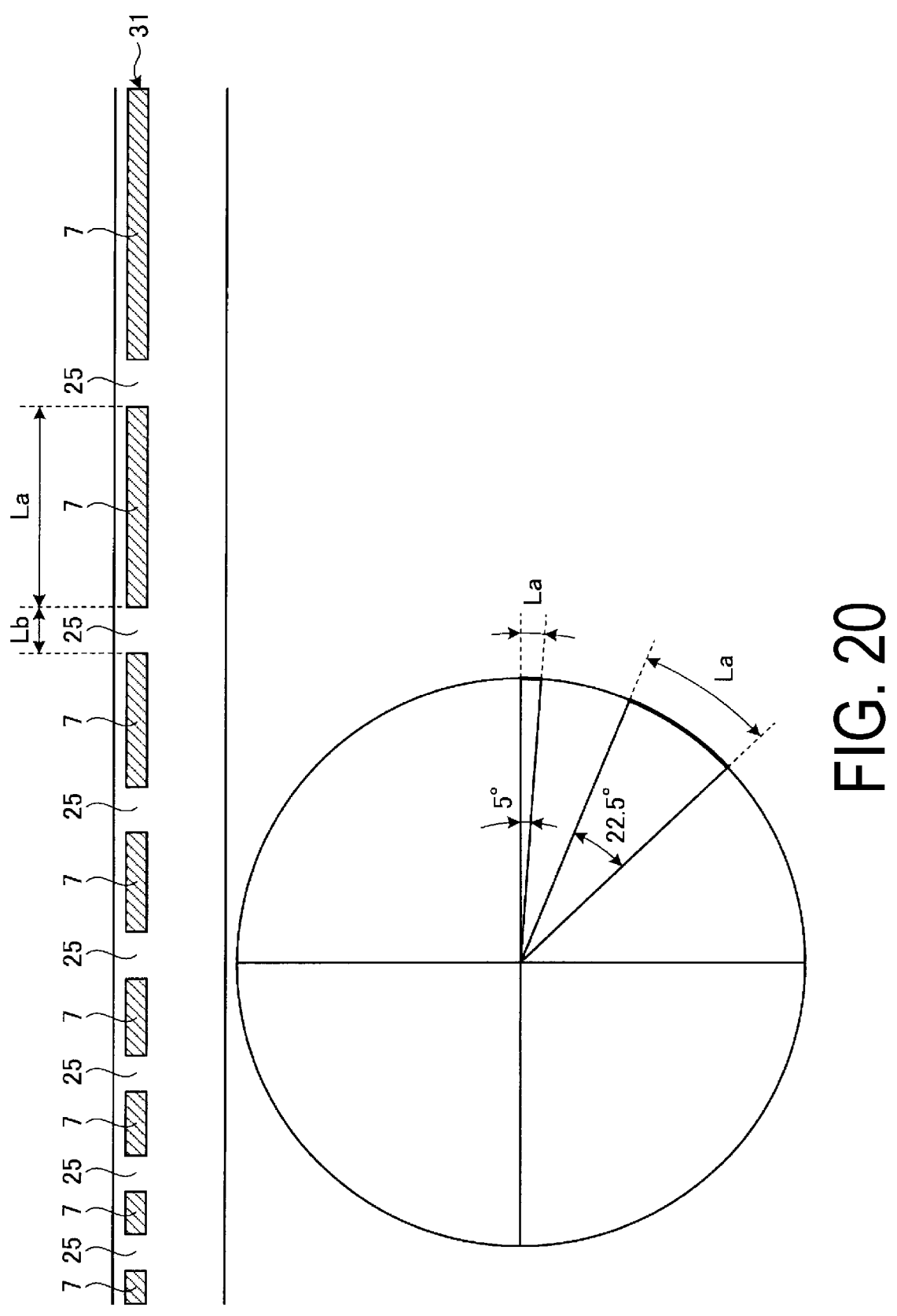
FIG. 20 is a drawing for explaining an example of a first belt region according to a tenth embodiment.

FIG. 20 is a diagram illustrating an example of the first belt region 31 according to the present embodiment. In the present embodiment, the dimension La in the circumferential direction of the colored regions 7 of the first belt region 31 and the dimension Lb of the blank regions 25 in the circumferential direction will be described. As described previously, the blank regions 25 include the ground colored regions 13 between adjacent colored regions 7.

The dimension La of the colored regions 7 and the dimension Lb of the blank regions 25 are preferably not less than 5° and not greater than 22.5°, in terms of an angle α of the circumferential direction of the tire 1. The dimension La and the dimension Lb can be calculated on the basis of the outer diameter OD (distance between the center axis AX and the surface of the tread portion 10) of the tire 1 and the angle α. For example, the dimension La and the dimension Lb can be calculated via the following operation:

$$\pi \times OD \times (\alpha/360).$$

The angle 22.5° corresponds to the length of one section when one circumferential length (circumference) of the tire 1 is divided into eight sections. The dimension of the tire 1 in the circumferential direction that is visible at one time to the following vehicle is about 45°, in terms of the angle α of the circumferential direction of the tire 1. That is, the dimension in the circumferential direction of the tire 1 that is visible at one time to the following vehicle is $\pi \times OD \times (45/360)$. As such, if the dimension La and the dimension Lb are larger than a dimension corresponding to 22.5°, which is $(\pi \times OD \times (22.5/360))$, the camera of the following vehicle may not be able to distinguish the plurality of colored regions 7 (or the blank regions 25) provided intermittently. If each of the dimension La and the dimension Lb is smaller than a dimension corresponding to 5°, which is $(\pi \times OD \times (5/360))$, the area of the colored regions 7 and the blank regions 25 may be excessively small, and it may not be possible to recognize the pattern formed by the colored regions 7 and the blank regions 25 in the images acquired by the camera of the following vehicle.

When each of the dimension La of the colored regions 7 and the dimension Lb of the blank regions 25 is not less than 5° and not greater than 22.5° in terms of the angle α of the circumferential direction of the tire 1, the camera of the following vehicle can recognize the pattern formed by the colored regions 7 and the blank regions 25 in an excellent manner.

Eleventh Embodiment

Next, an eleventh embodiment will be described. In the description below, identical or substantially similar constituent portions to those of the above-described embodiments are assigned with the same reference numbers, and descriptions of those constituent portions are either simplified or omitted.

In the present embodiment, a modified example of the first belt region 31 for speed measurement and the second belt region 32 for unique information identification will be described.

Figure 21:
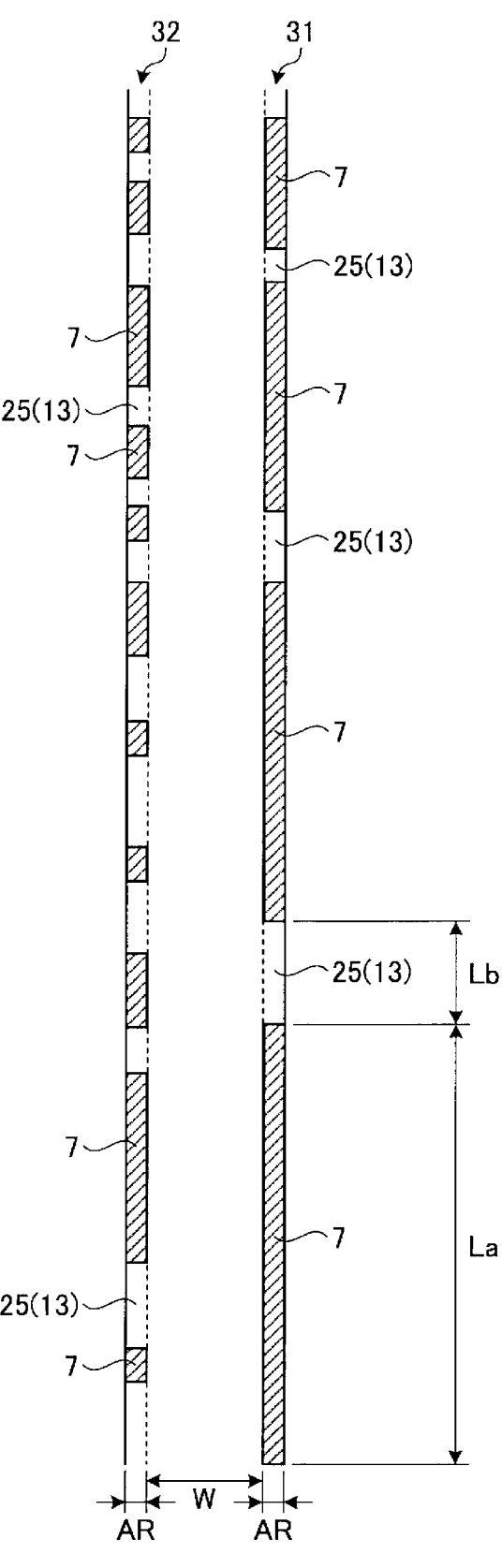
FIG. 21 is a development view illustrating an example of a pneumatic tire according to an eleventh embodiment.

FIG. 21 is a developed view in which the tread portion 10 of the tire 1 according to the present embodiment is developed in the circumferential direction. As illustrated in FIG. 21, the second belt region 32 is disposed in the shoulder region AR. The first belt region 31 is disposed in the shoulder region AR. The second belt region 32 is provided on the shoulder portion 12 on a first side (the −Y side) of the center portion 11. The first belt region 31 is provided on the shoulder portion 12 on a second side (the +Y side) of the center portion 11.

The first belt region 32 includes a plurality of colored regions 7 provided intermittently in the circumferential direction of the center axis AX, and a plurality of ground colored regions 13 (blank regions 25) provided between the colored regions 7. The second belt region 32 includes a plurality of colored regions 7 provided intermittently in the circumferential direction of the center axis AX, and a plurality of ground colored regions 13 (blank regions 25) provided between the colored regions 7.

An identification pattern is formed by the plurality of colored regions 7 of the second belt region 32. The second belt region 32 functions as a one-dimensional bar code. The one-dimensional bar code of the second belt region 32 is formed by the plurality of colored regions 7 and the plurality of ground colored regions 13 (blank regions 25) for which dimensions in the circumferential direction and numbers thereof are determined, on the basis of the unique information of the tire 1.

The first belt region 31 includes the plurality of colored regions 7 provided intermittently in the circumferential direction of the center axis AX, and the plurality of ground colored regions 13 provided between the colored regions 7. In the example illustrated in FIG. 21, four of the colored regions 7 are provided intermittently in the circumferential direction in the first belt region 31. The dimensions La in the circumferential direction of the plurality of colored regions 7 differ from each other. One ground colored region 13 (blank region 25) is provided between adjacent colored regions 7. A plurality of the blank regions 25 are provided intermittently in the circumferential direction. Here, the dimensions Lb in the circumferential direction of the plurality of blank regions 25 differ from each other.

Note that the dimensions La of the plurality of colored regions 7 may be equivalent. Additionally, the dimensions Lb of the plurality of blank regions 25 may be equivalent.

Figure 22:
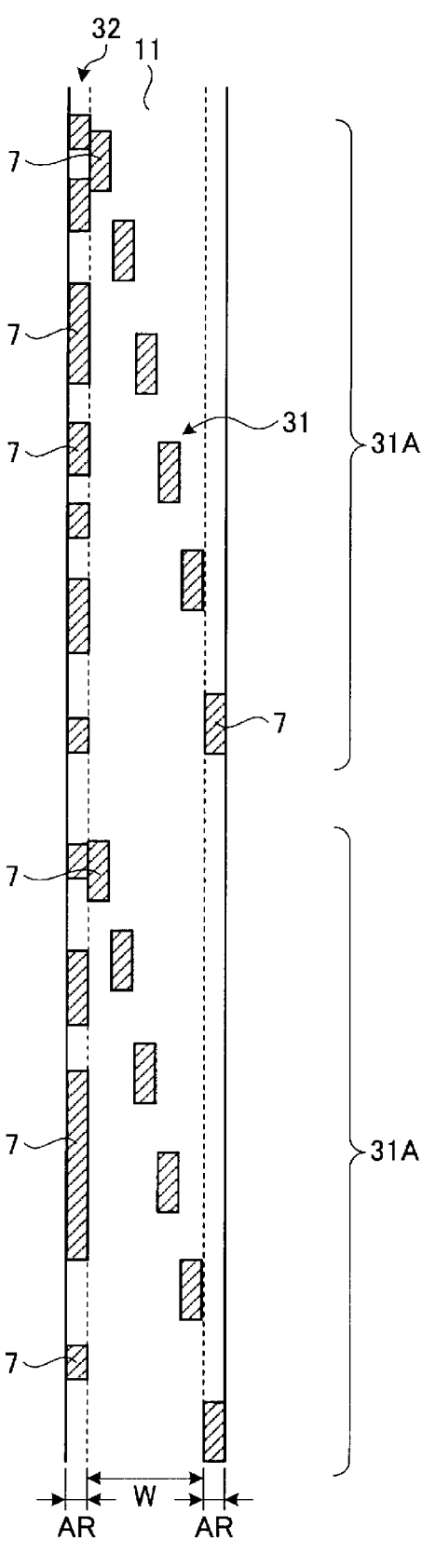
FIG. 22 is a development view illustrating an example of the pneumatic tire according to the eleventh embodiment.
Figure 23:
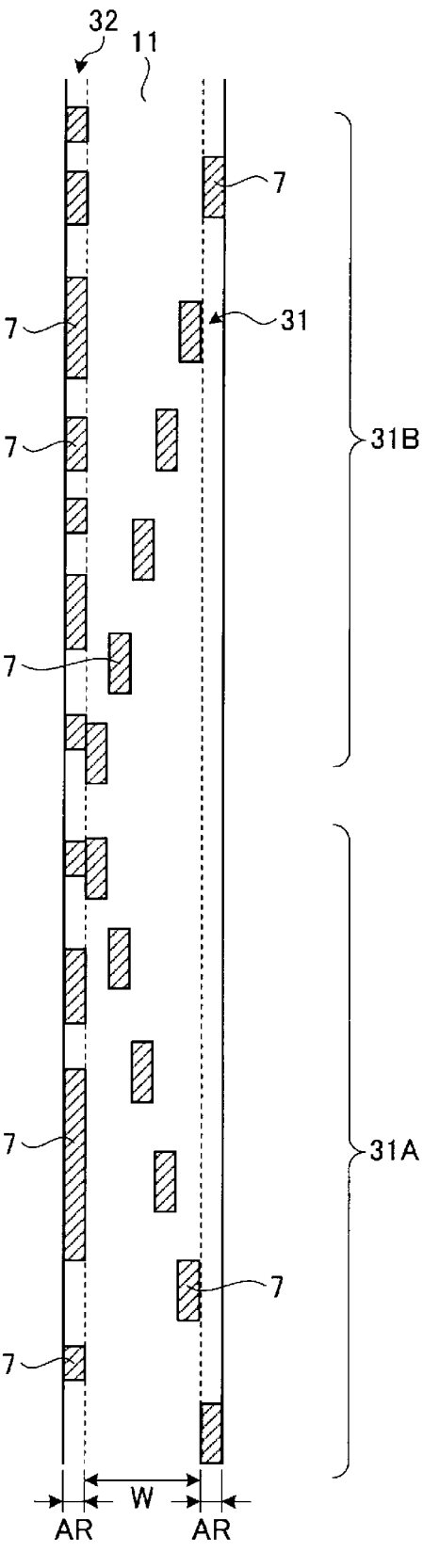
FIG. 23 is a development view illustrating an example of the pneumatic tire according to the eleventh embodiment.

FIGS. 22 and 23 illustrate other examples of the first belt region 31. In the examples illustrated in FIGS. 22 and 23, the colored regions 7 of the first belt region 31 are not only provided in the shoulder portion 12, but also in the center portion 11. The plurality of colored regions 7 are disposed in both the circumferential direction and the width direction of the tire 1. In the example illustrated in FIG. 22, the first belt region 31 includes two groups 31A in which positions of the colored regions 7 in the width direction of the tire 1 gradually change from a first side to a second side in the width direction. In the example illustrated in FIG. 23, the first belt region 31 includes a group 31A in which positions of the colored regions 7 in the width direction of the tire 1 gradually change from the first side to the second side in the width direction, and a group 31B in which the positions of the colored regions 7 in the width direction gradually change from the second side to the first side.

In the present embodiment, a dimension of each of the colored regions 7 of the second belt region 32 in the Y-axis direction is 5 mm or greater. The dimension of the colored regions 7 of the second belt region 32 in the Y-axis direction may be 7 mm or greater.

In the present embodiment, a dimension of each of the colored regions 7 of the first belt region 31 in the Y-axis direction is 5 mm or greater. The dimension of each of the colored regions 7 of the first belt region 31 in the Y-axis direction may be 7 mm or greater.

As in the embodiment described above, the tire 1 according to the present embodiment is mounted on the vehicle itself 100, which is leading on the road surface. The collision avoidance system of the following vehicle 200 acquires the unique information of the tire 1 mounted on the vehicle itself 100 from the images of the vehicle itself 100 acquired by the camera 201. The collision avoidance system of the following vehicle 200 acquires the unique information of the vehicle itself 100 on which the tire 1 is mounted from the images of the vehicle itself 100 acquired by the camera 201. The collision avoidance system of the following vehicle 200 estimates the travel speed of the vehicle itself 100 from the images of the vehicle itself 100 acquired by the camera 201.

The second belt region 32 includes the one-dimensional bar code that is formed by the plurality of colored regions 7 and the plurality of ground colored regions 13 (blank regions 25) for which dimensions in the circumferential direction and numbers thereof are determined, on the basis of the unique information of the tire 1. The camera 201 of the following vehicle 200 functions as a bar code reader. The camera 201 of the following vehicle 200 can acquire the unique information of the tire 1 by acquiring images of the unique information identification belt region 32.

The unique information of the tire 1 includes at least one of a tire manufacturing date, a maximum tire traveling speed, a tire dimension, a tire type, or a tire performance.

The following vehicle 200 can acquire information indicating the tire manufacturing date of the tire 1 by acquiring an image of the second belt region 32 of the tire 1 mounted on the vehicle itself 100. As a result, the following vehicle 200 can derive the amount of time passed since the tire manufacturing date.

The following vehicle 200 can acquire information indicating the maximum traveling speed of the tire 1 by acquiring an image of the second belt region 32 of the tire 1 mounted on the vehicle itself 100.

The following vehicle 200 can acquire information indicating the tire dimensions by acquiring an image of the second belt region 32 of the tire 1 mounted on the vehicle itself 100. The tire dimensions include, for example, at least one of a total tire width, a tire circumferential length, a tire outer diameter, a tire rim diameter, or an aspect ratio.

The following vehicle 200 can acquire information indicating the tire type by acquiring images of the second belt region 32 of the tire 1 mounted on the vehicle itself 100. Examples of tire types include the classifications (category classifications) of summer tires, winter tires, all-season tires, snow tires, studded tires, and studless tires.

The following vehicle 200 can acquire information indicating the tire performance by acquiring an image of the second belt region 32 of the tire 1 mounted on the vehicle itself 100. Examples of tire performance include wet grip performance stipulated by JATMA of the tire 1. Additional examples of the tire performance include the load index of the tire 1.

Note that the second belt region 32 may include a one-dimensional bar code that is formed by the plurality of colored regions 7 and the plurality of ground colored regions 13 (blank regions 25) for which dimensions in the circumferential direction and numbers thereof are determined, on the basis of the unique information of the vehicle itself 100 on which the tire 1 is mounted. The camera 201 of the following vehicle 200 functions as a bar code reader. The camera 201 of the following vehicle 200 can acquire the unique information of the vehicle itself 100 on which the tire 1 is mounted by acquiring images of the second belt region 32.

The unique information of the vehicle itself 100 includes the vehicle weight of the vehicle itself 100 and the dimensions of the vehicle itself 100. The dimensions of the vehicle itself 100 include the tread width of the vehicle itself 100 and the wheel base of the vehicle itself 100.

The tire 1 mounted on the vehicle itself 100 rotates about the center axis AX as a result of the traveling of the vehicle itself 100. The colored regions 7 and the blank regions 25 of the second belt region 32 disposed in the viewing area of the camera 201 of the following vehicle 200 change due to the rotating of the tire 1. The colored regions 7 and the blank regions 25 of the second belt region 32 form a one-dimensional bar code disposed in the circumferential direction of the tire 1. The region of the one-dimensional bar code disposed in the viewing area of the camera 201 of the following vehicle 200, which functions as a bar code reader, changes due to the rotating of the tire 1. That is, the viewing area of the camera 201 of the following vehicle 200 and the one-dimensional bar code provided on the tire 1 of the vehicle itself 100 move relative to each other due to the rotating of the tire 1 mounted on the vehicle itself 100. In other words, the one-dimensional bar code provided on the tire 1 of the vehicle itself 100 is scanned into the viewing area of the camera 201 of the following vehicle 200. As a result, the camera 201 of the following vehicle 200 can read the one-dimensional bar code of the tire 1 mounted on the vehicle itself 100, and can acquire the unique information of the tire 1 or the unique information of the vehicle itself 100 on which the tire 1 is mounted.

Thus, in the present embodiment, the second belt region 32 of the tire 1 mounted on the vehicle itself 100 functions as a belt region for unique information acquisition (unique information identification) for acquiring the unique information of the tire 1 or the unique information of the vehicle itself 100 using the camera (monocular camera) 201 of the following vehicle 200.

Additionally, in the present embodiment, the first belt region 31 for speed measurement is provided on the tire 1 mounted on the vehicle itself 100. The first belt region 31 includes the plurality of colored regions 7 provided intermittently in the circumferential direction (the rotation direction of the tire 1). The camera 201 of the following vehicle 200 acquires images of the tire 1 of the vehicle itself 100 at a predetermined frame rate (at a predetermined cycle). In cases where the camera 201 acquires images of the tire 1 that is rolling (traveling), the images of the first belt region 31 acquired at each frame rate will be different. Specifically, in cases where the camera 201 acquires images of the tire 1 that is rolling, positions of the colored regions 7 of the first belt region 31 in the viewing area of the camera 201 (or positions and areas of the colored regions occupying the viewing area of the camera 201) acquired at a first frame rate are different than positions of the colored regions 7 of the first belt region 31 in the viewing area of the camera 201 (or positions and areas of the colored regions occupying the viewing area of the camera 201) acquired at a second frame rate, subsequent to the first frame rate.

As such, the rotation speed of the tire 1 mounted on the vehicle itself 100 is estimated on the basis of the frame rate (cycle) at which the images are acquired and the images of the first belt region 31 acquired at each frame rate. The travel speed of the vehicle itself 100 can be estimated by the estimated rotation speed of the tire 1.

As such, in the present embodiment, the first belt region 31 of the tire 1 mounted on the vehicle itself 100 functions as a belt region for speed measurement (speed estimation) for measuring (estimating) the rotation speed of the tire 1 and the travel speed of the vehicle itself 100 using the camera 201 (monocular camera) of the following vehicle 200.

As described above, according to the present embodiment, the second belt region 32, which includes the plurality of colored regions 7 provided intermittently, is provided on the tire 1. The camera 201 of the following vehicle 200 can acquire images of the plurality of colored regions 7 and the plurality of ground colored regions 13 (blank regions 25) therebetween in the second belt region 32 that rotates as result of traveling. The second belt region 32 includes the unique information of the tire 1. As a result, the following vehicle 200 can acquire the unique information of the tire 1 mounted on the vehicle itself 100. Due to the unique information of the tire 1 mounted on the vehicle itself 100 being understood by the following vehicle 200, the following vehicle 200 can take measures to avoid colliding with the vehicle itself 100 on the basis of this unique information. As such, colliding of the following vehicle 200 into the vehicle itself 100 is prevented.

In the present embodiment, the unique information of the tire 1 includes at least one of a tire manufacturing date, a maximum tire traveling speed, a tire dimension, a tire type, or a tire performance. As a result, the following vehicle 200 will understand various information of the tire 1 mounted on the vehicle itself 100.

For example, in cases where a long period of time has passed since the tire manufacturing date, the tire 1 has a high possibility that the performance of the tire 1 has deteriorated. In such a case, the vehicle itself 100 has a high possibility of having problems stably traveling. In cases where the following vehicle 200 acquires information indicating the tire manufacturing date and determines that the amount of time passed since the tire manufacturing date is longer than a predetermined threshold value, the following vehicle 200 can take measures to avoid colliding with the vehicle itself 100 on the basis of the information indicating the tire manufacturing date.

Note that examples of "measures to avoid colliding with the vehicle itself 100" include the following vehicle 200 increasing the inter-vehicular distance from the vehicle itself 100, the following vehicle 200 changing lanes so as to travel in a lane different than the lane in which the vehicle itself 100 is traveling, and the like. These measures may be carried out automatically by the collision avoidance system, or may be performed by the driver of the following vehicle 200.

Additionally, in cases where the vehicle itself 100 is traveling at the maximum tire traveling speed of the tire 1 or faster, the vehicle itself 100 has a high possibility of having problems stably traveling. In cases where the following vehicle 200 acquires information indicating the maximum traveling speed and determines that the vehicle itself 100 is traveling a travel speed greater than or equal to the maximum traveling speed of the tire 1, the following vehicle 200 can take measures to avoid colliding with the vehicle itself 100 on the basis of the information indicating the maximum tire traveling speed.

The tire dimensions include, for example, at least one of a total tire width, a tire circumferential length, a tire outer diameter, a tire rim diameter, or an aspect ratio. Because information indicating the tire dimensions such as the total tire width, the tire circumferential length, the tire outer diameter, the tire rim diameter, and the aspect ratio is acquired by the following vehicle 200, the following vehicle 200 can determine whether or not the vehicle itself 100 is traveling in a manner suitable to the tire dimensions. In cases where it is determined that the vehicle itself 100 is not traveling in a manner suitable to the tire dimensions, the following vehicle 200 can take measures to avoid colliding with the vehicle itself 100 on the basis of the information indicating the tire dimensions.

Additionally, because information indicating the tire types is acquired by the following vehicle 200, the following vehicle 200 can determine whether or not a tire 1 of an appropriate tire type is mounted on the vehicle itself 100. Examples of tire types include the classifications (category classifications) of summer tires, winter tires, all-season tires, snow tires, studded tires, and studless tires. For example, in cases where summer tires are mounted on the vehicle itself 100 even though it is winter, the vehicle itself 100 has a high possibility of having problems stably traveling. In cases where the following vehicle 200 acquires information indicating the tire type and determines that a summer tire is mounted on the vehicle itself 100 even though it is winter, the following vehicle 200 can take measures to avoid colliding with the vehicle itself 100 on the basis of the information indicating the tire type.

Additionally, because information indicating the tire performance is acquired by the following vehicle 200, the following vehicle 200 can determine whether or not a tire 1 with appropriate tire performance is mounted on the vehicle itself 100. Examples of tire performance include wet grip performance stipulated by JATMA. In cases where a tire 1 with low grip performance is mounted on the vehicle itself 100 even though it is raining, the vehicle itself 100 has a high possibility of having problems stably traveling. In cases where the following vehicle 200 acquires information indicating the tire performance (wet grip performance) and determines that a tire 1 with low grip performance is mounted on the vehicle itself 100 even though it is raining, the following vehicle 200 can take measures to avoid colliding with the vehicle itself 100 on the basis of the information indicating the tire performance.

Additional examples of the tire performance include the load index of the tire 1. Because information indicating the load index is acquired by the following vehicle 200, the following vehicle 200 can determine whether or not the vehicle itself 100 is traveling in a manner suitable to the load index. In cases where it is determined that the vehicle itself 100 is not traveling in a manner suitable to the load index, the following vehicle 200 can take measures to avoid colliding with the vehicle itself 100 on the basis of the information indicating the load index.

The unique information of the tire 1 possessed by the second belt region 32 may also include unique information of the vehicle itself 100 on which the tire 1 is mounted. As a result, the following vehicle 200 will understand various information of the vehicle itself 100 on which the tire 1 is mounted.

Examples of the unique information of the vehicle itself 100 on which the tire 1 is mounted include information indicating the vehicle weight of the vehicle itself 100 and information indicating dimensions of the vehicle itself 100.

For example, in cases where the vehicle weight of the vehicle itself 100 is great, the vehicle itself 100 has a high possibility of having a longer braking distance. In cases where the following vehicle 200 acquires information indicating the vehicle weight of the vehicle itself 100 and determines that the vehicle weight of the vehicle itself 100 is greater than a predetermined threshold value, the following vehicle 200 can take measures to avoid colliding with the vehicle itself 100 on the basis of the information indicating the vehicle weight of the vehicle itself 100.

Additionally, the vehicle itself 100 has a possibility that the running performance of the vehicle itself 100 will change depending on the dimensions of the vehicle itself 100 such as the tread width of the vehicle itself 100 or the wheel base of the vehicle itself 100. The following vehicle 200 acquires information indicating the dimensions of the vehicle itself 100 and, thereby, can predict the running performance of the vehicle itself 100 and take measures to avoid colliding with the vehicle itself 100.

Figure 24:
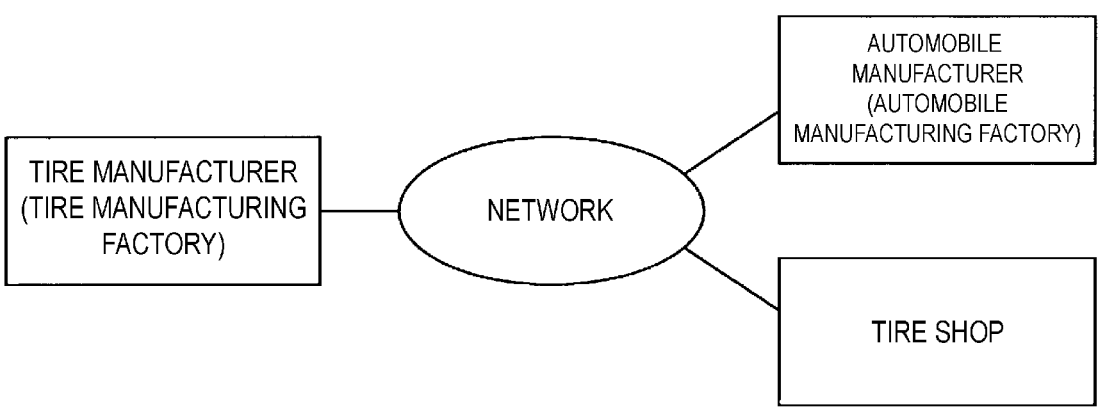
FIG. 24 is a drawing schematically illustrating an example of a communication method of unique information according to the eleventh embodiment.

Note that in cases where the tire 1 is made to possess the unique information of the vehicle itself 100, as illustrated in FIG. 24, the unique information of the vehicle itself 100 may be provided to a tire manufacturer (tire manufacturing factory) over a network. For example, the unique information of the vehicle itself 100 is provided from an automobile manufacturer (automobile manufacturing factory) to a tire manufacturer over a network. The tire manufacturer can provide the second belt region 32 (one-dimensional bar code) on the tire 1 on the basis of the provided unique information of the vehicle 100. Note that the unique information of the vehicle itself 100 may be provided from a tire shop to a tire manufacturer over a network. The tire manufacturer can provide the second belt region 32 (one-dimensional bar code) on the tire 1 on the basis of the provided unique information of the vehicle 100.

In the present embodiment, the second belt region 32 for unique information identification includes the one-dimensional bar code that is formed by the plurality of colored regions 7 and the plurality of ground colored regions 13 (blank regions 25) for which dimensions in the circumferential direction and numbers thereof are determined. As a result, due to the rotating of the tire 1, the camera 201 of the following vehicle 200 acquires images of the second belt region 32 that functions as a one-dimensional bar code. The camera 201 of the following vehicle 200, which functions as a bar code reader, can read the one-dimensional bar code provided on the tire 1 due to the rotation of the tire 1.

Additionally, in the present embodiment, the first belt region 31 for speed measurement is provided on the tire 1. As a result, the following vehicle 200 can understand the travel speed of the vehicle itself 100 due to the camera 201 of the following vehicle 200 acquiring images of the first belt region 31 of the vehicle itself 100.

For example, in cases where the following vehicle 200 acquires information indicating the maximum traveling speed of the tire 1 of the vehicle itself 100 from the second belt region 32 and acquires the travel speed of the tire 1 of the vehicle itself 100 from the first belt region 31, and determines that the vehicle itself 100 is traveling a travel speed greater than or equal to the maximum traveling speed of the tire 1, the following vehicle 200 can take measures to avoid colliding with the vehicle itself 100 on the basis of the information indicating the maximum tire traveling speed.

In the present embodiment, the dimension of the colored regions 7 of the second belt region 32 in the direction parallel to the center axis AX is 5 mm or greater. As a result, the tire 1 of the vehicle itself 100 will be recognized by the camera 201 of the following vehicle 200 at a high recognition rate.

In the present embodiment, the vehicle itself 100, on which the tire 1 is mounted on the rearmost wheel, will be recognized by the camera 201 of the following vehicle 200 at a high recognition rate. As such, the following vehicle 200 will easily understand the unique information. Accordingly, colliding of the following vehicle 200 into the vehicle itself 100 is prevented.

According to the present embodiment, the first belt region 31 is also provided on the surface of the shoulder portion 12 of the tire 1. As a result, contact between the colored regions 7 of the first belt region 31 and the road surface is suppressed. As such, the colored regions 7 will last a long time. Additionally, in cases where the tire 1 is mounted on the vehicle itself 100, not only the camera 201 of the following vehicle 200 just behind, but also a camera 201 of a following vehicle 200 right behind and a camera 201 of a following vehicle 200 left behind will recognize the tire 1 of the vehicle itself 100 at a high recognition rate.

As illustrated in FIG. 21, the dimensions La in the circumferential direction of the plurality of colored regions 7 of the first belt region 31 and the dimensions Lb in the circumferential direction of the plurality of blank regions 25 differ from each other. Because the plurality of colored regions 7 are disposed with unequal lengths and at unequal spacings, the camera 201 of the following vehicle 200 can estimate the rotation speed of the tire 1 with high accuracy on the basis of the images of the speed measurement belt region 31, even if the tire 1 is rotating at a high speed.

As illustrated in FIGS. 22 and 23, the plurality of colored regions 7 of the first belt region 31 are disposed such that the positions of the colored regions 7 not only in the circumferential direction but also in the width direction differ. As such, differences between the images at the first frame rate and images at the second frame rate are more prone to occur, even if the tire 1 is rotating at a high speed. As such, the camera 201 of the following vehicle 200 can estimate the rotation speed of the tire 1 with high accuracy on the basis of the images of the first belt region 31, even if the tire 1 is rotating at a high speed. Particularly, as illustrated in FIG. 23, in cases where the first belt region 31 includes the group 31A and the group 31B, rotation at higher speeds of the tire 1 can be handled.

Note that, in the present embodiment, the colored regions 7 of the second belt region 32 are provided on the shoulder portion 12. The colored regions 7 of the second belt region 32 may be provided on the center portion 11. As a result, the second belt region 32 will be recognized by the camera 201 of the following vehicle 200 at a high recognition rate. However, for example, the colored regions 7 of the second belt region 32 may be provided on the inner surface of the main grooves 21. Even with this configuration, contact of the colored regions 7 of the second belt region 32 with the road surface can be suppressed, and the colored regions 7 can be made to last a long time.

Note that, in the present embodiment, the colored regions 7 of the first belt region 31 are provided on the shoulder portion 12. However, for example, the colored regions 7 of the first belt region 31 may be provided on the inner surface of the main grooves 21. Even with this configuration, contact of the colored regions 7 of the first belt region 31 with the road surface can be suppressed, and the colored regions 7 can be made to last a long time.

Twelfth Embodiment

Next, a twelfth embodiment will be described. In the description below, identical or substantially similar constituent portions to those of the above-described embodiments are assigned with the same reference numbers, and descriptions of those constituent portions are either simplified or omitted.

Figure 25:
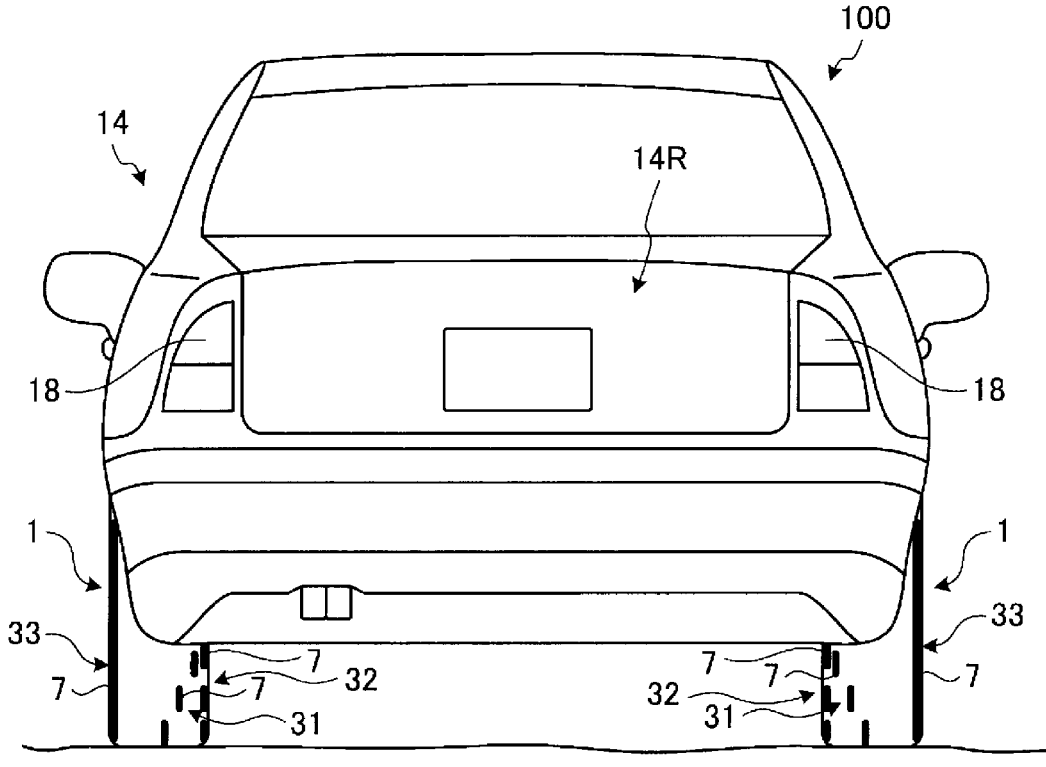
FIG. 25 is a drawing illustrating an example of a vehicle on which a pneumatic tire according to a twelfth embodiment is mounted.

FIG. 25 is a drawing of the vehicle 100 according to the present embodiment on which the tire 1 is mounted, viewed from behind the vehicle 100. In the present embodiment, the surface of the tire 1 further includes a third belt region 33 for image recognition, which includes a colored region 7 provided in the circumferential direction of the center axis AX.

The colored region 7 of the third belt region 33 is a region for image recognition. Images of the tire 1 are acquired by the camera 201. The color of the colored region 7 of the third belt region 33 is a color whereby the camera 201 can perform image recognition at a high recognition rate.

In the present embodiment, the colored region 7 of the third belt region 33 is provided in the circumferential direction. The colored region 7 of the third belt region 33 is disposed on the periphery of the center axis AX. In other words, the colored region 7 of the third belt region 33 does not break and is provided continuously in the circumferential direction. Note that the colored region 7 of the image recognition belt region 33 may be disposed on a portion of the periphery of the center axis AX.

In the present embodiment, the third belt region 33 is provided on the surface of the shoulder portion 12. Note that in the example illustrated in FIG. 25, at least a portion of the first belt region 31 for speed measurement is provided on the center portion 11. The second belt region 32 for unique information identification is provided on the shoulder portion 12.

In the present embodiment, the tire 1 includes the colored region 7 of the third belt region 33 for image recognition. The colored region 7 is colored with a color by which image recognition at a high recognition rate is possible, and is provided continuously in the circumferential direction. As such, even if the vehicle itself 100 on which the tire 1 is mounted is traveling, the colored region 7 of the rotating tire 1 will be recognized by the camera 201 of the following vehicle 200 at a high recognition rate.

As described above, according to the present embodiment, the third belt region 33 for image recognition is provided on the tire 1. As such, declines in the recognition rate of the tire 1, which is mounted on the vehicle itself 100, by the camera 201 of the following vehicle 200 are suppressed. As a result, estimation of the distance between the vehicle itself 100 and the following vehicle 200 can be performed with high accuracy. Accordingly, colliding of the following vehicle 200 into the vehicle itself 100 is prevented.

In the present embodiment, the colored region 7 of the third belt region 33 for image recognition is provided in the circumferential direction. As such, even if the tire 1 mounted on the vehicle itself 100 is traveling (rolling), the camera 201 of the following vehicle 200 can recognize the colored region 7 at a high recognition rate.

Additionally, the tire 1 contacts the road surface. In other words, the distance between the road surface and the tire 1 is short. The tire 1 is disposed at a position near the road surface. Therefore, for example, even in a case where the camera 201 acquires an image IMb of the tire 1 projected on a road surface that is wet due to rain, errors in the estimation results of the distance between the vehicle itself 100 and the following vehicle 200, based on the image of the tire 1 projected onto the road surface, are suppressed. As a result, declines in the recognition rate of the tire 1 mounted on the vehicle itself 100 are suppressed, and colliding of the following vehicle 200 into the vehicle itself 100 is prevented.

In the present embodiment, the reflectance of the colored region 7 with respect to visible light is greater than the reflectance of the ground colored region 13 with respect to visible light. As a result, the camera 201 can recognize the colored region 7 at a high recognition rate. For example, even when it rains at night, the camera 201 can recognize the colored region 7 at a high recognition rate.

In the present embodiment, the colored region 7 of the third belt region 33 is provided on the surface of the shoulder portion 12. As a result, contact between the colored region 7 of the third belt region 33 and the road surface is suppressed, and the colored region 7 can be made to last a long time. Additionally, in cases where the tire 1 is mounted on the vehicle itself 100, not only the camera 201 of the following vehicle 200 just behind, but also a camera 201 of a following vehicle 200 right behind and a camera 201 of a following vehicle 200 left behind can recognize the tire 1 of the vehicle itself 100 at a high recognition rate.

As described in the embodiments above, the unique information of the tire 1 possessed by the second belt region 32 for unique information identification may include circumferential length data of the tire 1. The following vehicle 200 acquires circumferential length data of the tire 1 from the second belt region 32 and rotation speed data of the tire 1 from the first belt region 31 for speed measurement. As such, the travel speed of the leading vehicle itself 100 can be more accurately calculated on the basis of the circumferential length data and the rotation speed data.

As described in the embodiments above, the unique information of the tire 1 possessed by the second belt region 32 for unique information identification may include width data indicating the width dimension of the tire 1. The following vehicle 200 acquires the width data of the tire 1 from the second belt region 32 and corrects the size of the tire 1, acquired from the images, on the basis of the width data. As such, correct dimension data of the tire 1 can be acquired from the image data.

The unique information of the tire 1 possessed by the second belt region 32 for unique information identification may include overall width data indicating the overall width dimension of the vehicle itself 100 on which the tire 1 is mounted. The following vehicle 200 acquires the overall width data of the vehicle itself 100 from the unique information identification belt region 32 and corrects the size of the vehicle itself 100 and the size of the tire 1, acquired from the images, on the basis of the overall width data. As such, correct dimension data of the vehicle itself 100 and correct dimension data of the tire 1 can be acquired from the image data.

Note that, in the embodiments described above, the colored region 7 is formed by applying a coating material to the foundation, namely the rubber. A configuration is possible in which a portion of the rubber is colored. That is, the colored region 7 may be formed by a colored rubber layer. The colored rubber layer includes colored rubber containing a colorant. Because the tire 1 includes colored rubber containing a colorant and the colored region 7 includes the surface of the colored rubber, the tire 1 including the colored region 7 can be easily manufactured.

Thirteenth Embodiment

Next, a thirteenth embodiment will be described. In the description below, identical or substantially similar constituent portions to those of the above-described embodiments are assigned with the same reference numbers, and descriptions of those constituent portions are either simplified or omitted.

Figure 26:
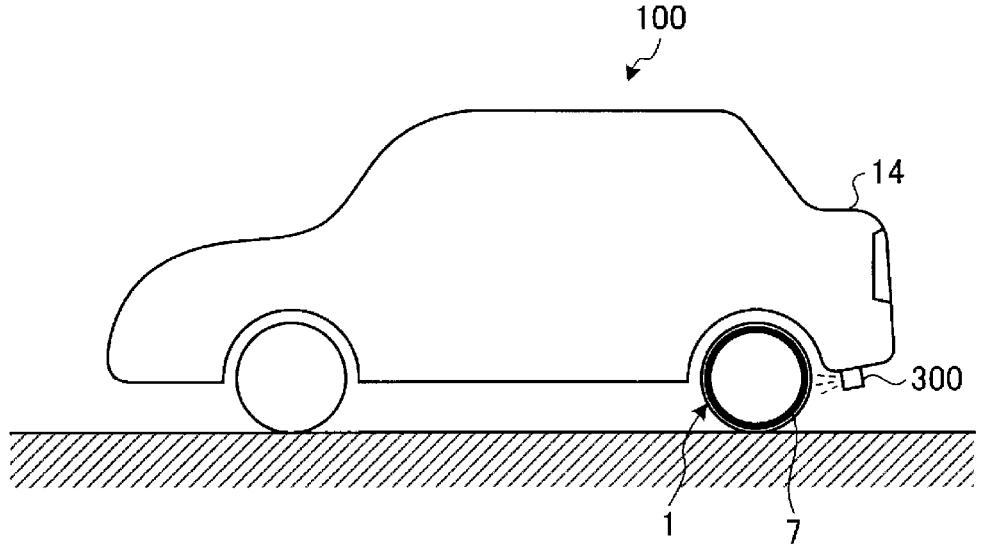
FIG. 26 is a drawing illustrating an example of a vehicle according to a thirteenth embodiment.

FIG. 26 is a drawing illustrating an example of a vehicle 100 according to the present embodiment. As illustrated in FIG. 26, in the present embodiment, the vehicle 100 is provided with a lighting device 300 configured to illuminate the tire 1 mounted on the rearmost wheel. The tire 1 is illuminated by the lighting device 300 at night, for example.

The lighting device 300 is supported by the vehicle body 14. The lighting device 300 is disposed farther back than the tire 1 mounted on the rearmost wheel. The lighting device 300 is supported on the vehicle body 14 of the vehicle itself 100 between the tire 1 of the vehicle itself 100 and the camera 201 of the following vehicle 200. The lighting device 300 illuminates the tire 1 from behind the tire 1.

As described above, due to the tire 1 being illuminated by the lighting device 300, even at night for example, the camera 201 of the following vehicle 200 can recognize the tire 1 of the vehicle itself 100 at a high recognition rate.

Figure 27:
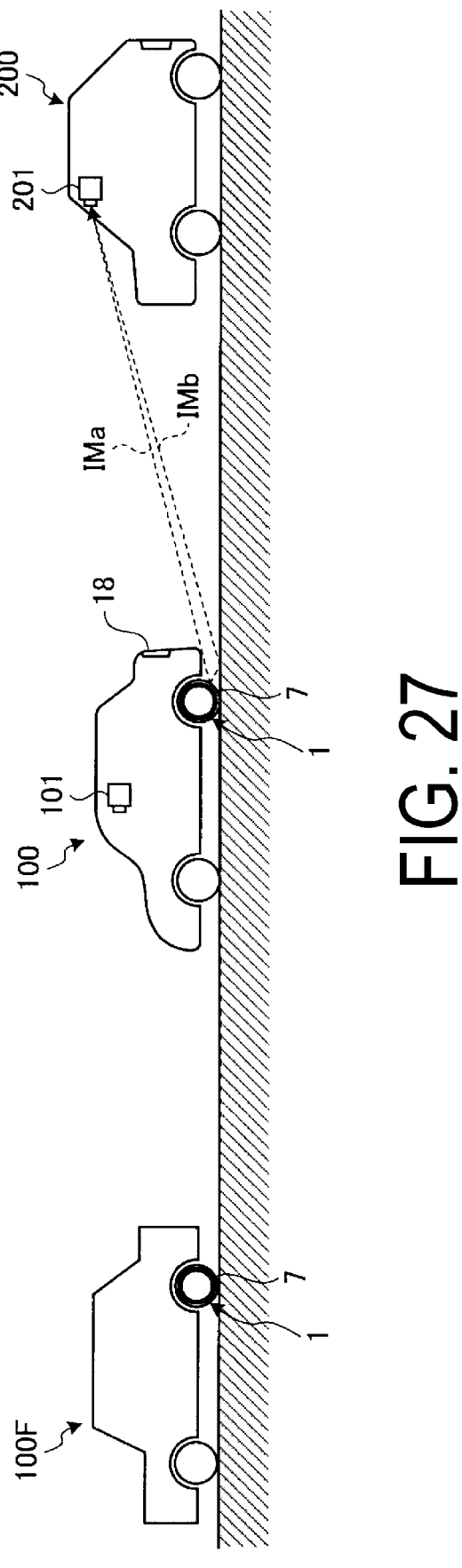
FIG. 27 is a schematic drawing for explaining a relationship between a leading vehicle, the vehicle itself, and a following vehicle.

Note that in the embodiments described above, a configuration is described in which the tire 1 is mounted on the vehicle itself 100 and the following vehicle 200 behind the vehicle itself 100 is equipped with a collision avoidance system including the camera 201. As a result, colliding of the following vehicle 200 into the vehicle itself 100 can be prevented. As illustrated in FIG. 27, a configuration is possible in which the tire 1 is mounted on a leading vehicle 100F in front of the vehicle itself 100, and the vehicle itself 100 behind the leading vehicle 100F is provided with a collision avoidance system including a camera 101. As a result, the vehicle itself 100 can recognize the leading vehicle 100F at a high recognition rate and can be prevented from rear-ending the leading vehicle 100F.

The invention claimed is:

1. A pneumatic tire, comprising:
a carcass portion;
a belt layer;
a tread portion including a tread rubber; and
a sidewall portion including a sidewall rubber; wherein
the tread portion includes:
    a center portion,
    shoulder portions disposed on both sides of the center portion,
    a lug groove disposed at the shoulder portions and extending outward of a ground contact edge portion of the tread portion, wherein
    a shoulder region is defined as a region between the ground contact edge portion and a terminating portion of the lug groove,
    the shoulder region is an uncontacted region to a ground and is disposed out of the ground contact edge portion in the tire width direction,
    a colored region is disposed continuously or intermittently in the circumferential direction in the shoulder region, the colored region is provided outward in the radial direction of an edge in the tire width direction of the belt layer in a meridian cross-section through a tire rotation axis, the colored region and the belt layer overlap each other in the tire width direction, and the colored region is not disposed at any surface of the pneumatic tire other than the shoulder portions.

2. The pneumatic tire according to claim 1, wherein the surface of the tire other than the colored region is a ground colored region.

3. A pneumatic tire, comprising:

a carcass portion;

a belt layer;

a tread portion including a tread rubber; and a sidewall portion including a sidewall rubber; wherein the tread portion includes:

a center portion, shoulder portions disposed on both sides of the center portion, a lug groove disposed at the shoulder portions and extending outward of a ground contact edge portion of the tread portion, wherein a shoulder region is defined as a region between the ground contact edge portion and a terminating portion of the lug groove, the shoulder region is an uncontacted region to a ground and is disposed out of the ground contact edge portion in the tire width direction, a colored region is disposed continuously or intermittently in the circumferential direction in the shoulder region, the colored region and the belt layer overlap each other in the tire width direction in a meridian cross-section through a tire rotation axis, and the colored region is not disposed at any surface of the pneumatic tire other than the shoulder portions.

4. The pneumatic tire according to claim 3, wherein the surface of the tire other than the colored region is a ground colored region.

5. A pneumatic tire, comprising:

a carcass portion;

a belt layer;

a tread portion including a tread rubber; and a sidewall portion including a sidewall rubber; wherein the tread portion includes:

a center portion, shoulder portions disposed on both sides of the center portion, a lug groove disposed at the shoulder portions and extending outward of a ground contact edge portion of the tread portion, wherein a shoulder region is defined as a region between the ground contact edge portion and a terminating portion of the lug groove, the shoulder region is an uncontacted region to a ground and is disposed out of the ground contact edge portion in the tire width direction, a colored region is disposed continuously or intermittently in the circumferential direction in the shoulder region, and the colored region is not disposed at any surface of the pneumatic tire other than the shoulder portions.

6. The pneumatic tire according to claim 5, wherein the colored region includes a plurality of regions arranged in a row in the circumferential direction.

7. The pneumatic tire according to claim 5, wherein the colored region is provided outward in the radial direction of an edge in the tire width direction of the belt layer in a meridian cross-section through a tire rotation axis.

8. The pneumatic tire according to claim 5, wherein the colored region and the belt layer overlap each other in the tire width direction.

9. The pneumatic tire according to claim 5, wherein a dimension of the colored region in the direction parallel to the tire rotation axis is 10 mm or greater.

10. The pneumatic tire according to claim 5, further comprising:

colored rubber containing a colorant; wherein the colored region includes a surface of the colored rubber.

11. The pneumatic tire according to claim 5, wherein the surface of the tire other than the colored region is a ground colored region.

12. A vehicle, comprising:

a plurality of wheels; and the pneumatic tire described in claim 5; wherein the pneumatic tire is mounted on at least a rearmost wheel of the plurality of wheels.

13. The vehicle according to claim 12, further comprising a lighting device configured to illuminate the pneumatic tire mounted on the rearmost wheel.

14. The pneumatic tire according to claim 5, wherein the colored region includes a surface of a coating material applied to the rubber.

15. The pneumatic tire according to claim 14, wherein the coating material includes a fluorescent coating material.

16. The pneumatic tire according to claim 14, wherein the coating material includes a retroreflective material.

17. The pneumatic tire according to claim 5, wherein the colored region includes a plurality regions provided intermittently in the circumferential direction of the tire rotation axis.

18. The pneumatic tire according to claim 17, wherein dimensions in the circumferential direction of the plurality regions differ from each other.

19. The pneumatic tire according to claim 17, wherein the plurality regions is a unique information identification belt region for identifying unique information.

20. The pneumatic tire according to claim 19, wherein the unique information includes a wear state of the tread portion.

21. The pneumatic tire according to claim 19, wherein the unique information includes at least one of a tire manufacturing date, a maximum tire traveling speed, a tire dimension, a tire type, or a tire performance.

22. The pneumatic tire according to claim 19, wherein the unique information includes unique information of a vehicle on which the pneumatic tire is to be mounted.

23. The pneumatic tire according to claim 19, wherein a one-dimensional bar code formed by the plurality regions and ground colored regions for which numbers and dimensions in the circumferential direction are determined on the basis of the unique information.

24. The pneumatic tire according to claim 23, wherein reflectance of the colored region with respect to visible light is greater than reflectance of the ground colored region.

* * * * *